United States Patent
Maes et al.

(10) Patent No.: US 8,914,493 B2
(45) Date of Patent: Dec. 16, 2014

(54) PRESENCE-BASED EVENT DRIVEN ARCHITECTURE

(75) Inventors: Stephane H. Maes, Fremont, CA (US); Wenchao Sun, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 64 days.

(21) Appl. No.: 12/045,220

(22) Filed: Mar. 10, 2008

(65) Prior Publication Data

US 2009/0228584 A1   Sep. 10, 2009

(51) Int. Cl.
- *G06F 15/173* (2006.01)
- *H04L 29/08* (2006.01)
- *H04L 12/58* (2006.01)
- *G06F 9/54* (2006.01)

(52) U.S. Cl.
CPC .............. *H04L 12/581* (2013.01); *H04L 67/24* (2013.01); *H04L 51/04* (2013.01); *H04L 67/26* (2013.01); *G06F 9/542* (2013.01)
USPC .......................................... 709/224; 707/609

(58) Field of Classification Search
CPC ......... H04L 67/22; H04L 67/24; H04L 67/30; H04L 12/581; H04L 51/04; H04L 67/26; G06F 9/542
USPC .......... 709/224, 225, 205, 227, 222; 707/6, 9, 707/609; 725/46, 47; 719/318; 370/254, 370/401, 352; 379/67.1; 715/764
See application file for complete search history.

(56) References Cited

U.S. PATENT DOCUMENTS

| | | | |
|---|---|---|---|
| 5,414,812 | A | 5/1995 | Filip et al. |
| 5,613,060 | A | 3/1997 | Britton et al. |
| 5,699,513 | A | 12/1997 | Feigen et al. |
| 5,737,321 | A | 4/1998 | Takahashi |

(Continued)

FOREIGN PATENT DOCUMENTS

| | | |
|---|---|---|
| EP | 2 034 748 A1 | 3/2009 |
| WO | WO 2007134468 A1 | 11/2007 |
| WO | 2008111027 | 12/2008 |
| WO | 2008146097 | 12/2008 |

OTHER PUBLICATIONS

Simpson et al, Java Product Review—Oracle EDA Suite, Dec. 4, 2006, Open Source Magazine, pp. 1-10.*
U.S. Appl. No. 60/882,303, filed Dec. 28, 2006.*

(Continued)

*Primary Examiner* — Jungwon Chang
(74) *Attorney, Agent, or Firm* — Kilpatrick Townsend & Stockton LLP

(57) ABSTRACT

Embodiments of the invention provide systems and methods for using a presence-based network to monitor systems, devices, or agents. According to one embodiment, monitoring a system can comprise receiving a publication of one or more presence attributes from a presence network agent. The presence attributes can comprise at least one attribute indicating information other than presence information. A presence profile associated with the presence network agent can be updated based on the received presence attributes. One or more of the presence attributes of the presence profile associated with the presence network agent can be provided to a listener. For example, providing presence attributes to the listener can comprise providing a notification of a change in the at least one presence attribute. Additionally or alternatively, a request can be received from the listener for one or more presence attributes and the presence attribute can be provided in response to the request.

38 Claims, 10 Drawing Sheets

(56) References Cited

U.S. PATENT DOCUMENTS

| | | |
|---|---|---|
| 5,786,770 A | 7/1998 | Thompson |
| 5,850,517 A | 12/1998 | Verkler et al. |
| 5,867,665 A | 2/1999 | Butman et al. |
| 5,946,634 A | 8/1999 | Korpela |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1 | 11/2004 | Byrne et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 * | 12/2006 | Dorner et al. ............... 719/318 |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,269,162 B1 * | 9/2007 | Turner ............... 370/352 |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 * | 12/2008 | Stewart et al. ............... 707/6 |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,904,909 B1 | 3/2011 | Reiner et al. |
| 7,925,727 B2 | 4/2011 | Sullivan et al. |
| 7,933,397 B2 | 4/2011 | Jain |
| 8,023,971 B2 | 9/2011 | Egli |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes et al. |
| 8,370,506 B2 | 2/2013 | Maes |
| 8,401,022 B2 | 3/2013 | Maes et al. |
| 8,458,703 B2 | 6/2013 | Maes |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120729 A1 | 8/2002 | Faccin et al. |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0191823 A1 | 10/2003 | Bansal et al. |

(56) References Cited

U.S. PATENT DOCUMENTS

| | | | |
|---|---|---|---|
| 2003/0208539 A1* | 11/2003 | Gildenblat et al. | 709/205 |
| 2003/0217044 A1 | 11/2003 | Zhang et al. | |
| 2003/0229760 A1 | 12/2003 | Doyle et al. | |
| 2003/0229812 A1 | 12/2003 | Buchholz | |
| 2004/0015547 A1 | 1/2004 | Griffin et al. | |
| 2004/0015578 A1 | 1/2004 | Karakashian et al. | |
| 2004/0024720 A1 | 2/2004 | Fairweather | |
| 2004/0064528 A1 | 4/2004 | Meredith et al. | |
| 2004/0068586 A1 | 4/2004 | Xie et al. | |
| 2004/0093593 A1 | 5/2004 | Jhanwar et al. | |
| 2004/0100923 A1 | 5/2004 | Yam | |
| 2004/0110493 A1 | 6/2004 | Alvarez et al. | |
| 2004/0125758 A1 | 7/2004 | Hayduk | |
| 2004/0128546 A1 | 7/2004 | Blakley et al. | |
| 2004/0133627 A1 | 7/2004 | Kalyanaraman et al. | |
| 2004/0139319 A1 | 7/2004 | Favazza et al. | |
| 2004/0148334 A1 | 7/2004 | Arellano et al. | |
| 2004/0153545 A1 | 8/2004 | Pandya et al. | |
| 2004/0161090 A1 | 8/2004 | Digate et al. | |
| 2004/0162881 A1 | 8/2004 | Digate et al. | |
| 2004/0176988 A1 | 9/2004 | Boughannam | |
| 2004/0221005 A1 | 11/2004 | Albaugh et al. | |
| 2005/0004974 A1 | 1/2005 | Sharma et al. | |
| 2005/0015340 A1 | 1/2005 | Maes | |
| 2005/0021670 A1 | 1/2005 | Maes | |
| 2005/0050194 A1 | 3/2005 | Honeisen et al. | |
| 2005/0054287 A1 | 3/2005 | Kim | |
| 2005/0068167 A1 | 3/2005 | Boyer et al. | |
| 2005/0073982 A1 | 4/2005 | Corneille et al. | |
| 2005/0075115 A1 | 4/2005 | Corneille et al. | |
| 2005/0086197 A1 | 4/2005 | Boubez et al. | |
| 2005/0086297 A1 | 4/2005 | Hinks | |
| 2005/0091156 A1 | 4/2005 | Hailwood et al. | |
| 2005/0125696 A1 | 6/2005 | Afshar et al. | |
| 2005/0132086 A1 | 6/2005 | Flurry et al. | |
| 2005/0141691 A1 | 6/2005 | Wengrovitz | |
| 2005/0144557 A1 | 6/2005 | Li et al. | |
| 2005/0172027 A1 | 8/2005 | Castellanos et al. | |
| 2005/0193269 A1 | 9/2005 | Haswell et al. | |
| 2005/0228984 A1 | 10/2005 | Edery et al. | |
| 2005/0239485 A1 | 10/2005 | Kundu et al. | |
| 2005/0249190 A1 | 11/2005 | Birch | |
| 2005/0249344 A1 | 11/2005 | Mueller et al. | |
| 2005/0267979 A1 | 12/2005 | Bailey | |
| 2006/0014688 A1 | 1/2006 | Costa et al. | |
| 2006/0021010 A1 | 1/2006 | Atkins et al. | |
| 2006/0031559 A1 | 2/2006 | Sorokopud et al. | |
| 2006/0036689 A1 | 2/2006 | Buford et al. | |
| 2006/0041669 A1 | 2/2006 | Bemmel et al. | |
| 2006/0048159 A1 | 3/2006 | Yazawa et al. | |
| 2006/0053227 A1 | 3/2006 | Ye et al. | |
| 2006/0072474 A1 | 4/2006 | Mitchell | |
| 2006/0080117 A1 | 4/2006 | Carr et al. | |
| 2006/0104306 A1 | 5/2006 | Adamczyk et al. | |
| 2006/0104431 A1 | 5/2006 | Emery et al. | |
| 2006/0112400 A1 | 5/2006 | Zhang et al. | |
| 2006/0116912 A1 | 6/2006 | Maes | |
| 2006/0117109 A1 | 6/2006 | Maes | |
| 2006/0117376 A1 | 6/2006 | Maes | |
| 2006/0136560 A1 | 6/2006 | Jiang | |
| 2006/0143622 A1 | 6/2006 | Prabandham et al. | |
| 2006/0143686 A1 | 6/2006 | Maes | |
| 2006/0164902 A1 | 7/2006 | Fung | |
| 2006/0165060 A1 | 7/2006 | Dua | |
| 2006/0178898 A1 | 8/2006 | Habibi | |
| 2006/0190600 A1* | 8/2006 | Blohm et al. | 709/225 |
| 2006/0210033 A1 | 9/2006 | Grech et al. | |
| 2006/0212574 A1 | 9/2006 | Maes | |
| 2006/0229078 A1 | 10/2006 | Itzkovitz et al. | |
| 2006/0256774 A1 | 11/2006 | Rigaldies et al. | |
| 2006/0272028 A1 | 11/2006 | Maes | |
| 2006/0282856 A1* | 12/2006 | Errico et al. | 725/46 |
| 2006/0291507 A1 | 12/2006 | Sarosi et al. | |
| 2007/0005770 A1 | 1/2007 | Kramer et al. | |
| 2007/0011191 A1 | 1/2007 | Otokawa et al. | |
| 2007/0011322 A1 | 1/2007 | Moiso | |
| 2007/0027975 A1 | 2/2007 | Tai et al. | |
| 2007/0047534 A1 | 3/2007 | Hakusui | |
| 2007/0061397 A1 | 3/2007 | Gregorat et al. | |
| 2007/0071224 A1 | 3/2007 | Shtivelman et al. | |
| 2007/0088836 A1 | 4/2007 | Tai et al. | |
| 2007/0099613 A1 | 5/2007 | Burgan et al. | |
| 2007/0100831 A1* | 5/2007 | Cox | 707/9 |
| 2007/0100981 A1 | 5/2007 | Adamczyk et al. | |
| 2007/0112574 A1 | 5/2007 | Greene | |
| 2007/0117556 A1 | 5/2007 | Rogalski | |
| 2007/0118618 A1 | 5/2007 | Kisel et al. | |
| 2007/0118648 A1 | 5/2007 | Millefiorini et al. | |
| 2007/0118662 A1 | 5/2007 | Vishwanathan et al. | |
| 2007/0121539 A1 | 5/2007 | Kikuchi | |
| 2007/0150480 A1 | 6/2007 | Hwang et al. | |
| 2007/0150936 A1 | 6/2007 | Maes | |
| 2007/0173226 A1 | 7/2007 | Cai et al. | |
| 2007/0182541 A1 | 8/2007 | Harris et al. | |
| 2007/0189466 A1 | 8/2007 | Croak et al. | |
| 2007/0192374 A1 | 8/2007 | Abnous et al. | |
| 2007/0192465 A1 | 8/2007 | Modarressi | |
| 2007/0197227 A1 | 8/2007 | Naqvi et al. | |
| 2007/0201376 A1 | 8/2007 | Marshall-Wilson | |
| 2007/0203841 A1 | 8/2007 | Maes | |
| 2007/0204017 A1 | 8/2007 | Maes | |
| 2007/0223462 A1 | 9/2007 | Hite et al. | |
| 2007/0223671 A1 | 9/2007 | Lee | |
| 2007/0233883 A1 | 10/2007 | De Lutiis et al. | |
| 2007/0239866 A1* | 10/2007 | Cox et al. | 709/224 |
| 2007/0255662 A1 | 11/2007 | Tumminaro | |
| 2007/0271554 A1 | 11/2007 | Fletcher et al. | |
| 2007/0276907 A1 | 11/2007 | Maes | |
| 2007/0280226 A1 | 12/2007 | Sonalkar et al. | |
| 2007/0291859 A1 | 12/2007 | Maes | |
| 2008/0013533 A1 | 1/2008 | Bogineni et al. | |
| 2008/0025243 A1 | 1/2008 | Corneille et al. | |
| 2008/0037747 A1 | 2/2008 | Tucker | |
| 2008/0043975 A1 | 2/2008 | Miloslavsky et al. | |
| 2008/0049929 A1 | 2/2008 | Miloslavsky et al. | |
| 2008/0080479 A1 | 4/2008 | Maes | |
| 2008/0095326 A1* | 4/2008 | Qi et al. | 379/67.1 |
| 2008/0109853 A1 | 5/2008 | Einarsson et al. | |
| 2008/0126541 A1 | 5/2008 | Rosenberg et al. | |
| 2008/0127232 A1 | 5/2008 | Langen et al. | |
| 2008/0147799 A1 | 6/2008 | Morris | |
| 2008/0151768 A1 | 6/2008 | Liu | |
| 2008/0151918 A1 | 6/2008 | Foti | |
| 2008/0162637 A1 | 7/2008 | Adamczyk et al. | |
| 2008/0168523 A1 | 7/2008 | Ansari et al. | |
| 2008/0175251 A1 | 7/2008 | Oouchi et al. | |
| 2008/0175357 A1 | 7/2008 | Tucker | |
| 2008/0186845 A1 | 8/2008 | Maes | |
| 2008/0189401 A1 | 8/2008 | Maes | |
| 2008/0201705 A1 | 8/2008 | Wookey | |
| 2008/0201715 A1 | 8/2008 | Breiter et al. | |
| 2008/0212762 A1 | 9/2008 | Gray et al. | |
| 2008/0222694 A1 | 9/2008 | Nakae | |
| 2008/0228919 A1 | 9/2008 | Doshi et al. | |
| 2008/0232567 A1 | 9/2008 | Maes | |
| 2008/0235230 A1 | 9/2008 | Maes | |
| 2008/0235327 A1 | 9/2008 | Maes et al. | |
| 2008/0235354 A1 | 9/2008 | Maes | |
| 2008/0235380 A1 | 9/2008 | Maes | |
| 2008/0253543 A1 | 10/2008 | Aharon | |
| 2008/0275883 A1 | 11/2008 | Ashraf et al. | |
| 2008/0281607 A1 | 11/2008 | Sajja et al. | |
| 2008/0288966 A1 | 11/2008 | Maes | |
| 2008/0301135 A1* | 12/2008 | Alves et al. | 707/6 |
| 2008/0307108 A1 | 12/2008 | Yan et al. | |
| 2009/0003362 A1* | 1/2009 | Pattabhiraman et al. | 370/401 |
| 2009/0006360 A1 | 1/2009 | Liao et al. | |
| 2009/0015433 A1 | 1/2009 | James et al. | |
| 2009/0022072 A1 | 1/2009 | Zhu et al. | |
| 2009/0022286 A1 | 1/2009 | Brunson et al. | |
| 2009/0034426 A1 | 2/2009 | Luft et al. | |
| 2009/0061404 A1 | 3/2009 | Toly | |
| 2009/0086950 A1 | 4/2009 | Vendrow et al. | |
| 2009/0093240 A1 | 4/2009 | Lang | |

(56) References Cited

U.S. PATENT DOCUMENTS

| | | | |
|---|---|---|---|
| 2009/0106677 A1* | 4/2009 | Son et al. | 715/764 |
| 2009/0109959 A1 | 4/2009 | Elliott et al. | |
| 2009/0112875 A1 | 4/2009 | Maes | |
| 2009/0119303 A1 | 5/2009 | Rio et al. | |
| 2009/0125595 A1 | 5/2009 | Maes | |
| 2009/0132220 A1 | 5/2009 | Chakraborty et al. | |
| 2009/0132717 A1 | 5/2009 | Maes | |
| 2009/0154681 A1 | 6/2009 | Kung et al. | |
| 2009/0185576 A1 | 7/2009 | Kisel et al. | |
| 2009/0187919 A1 | 7/2009 | Maes | |
| 2009/0190603 A1 | 7/2009 | Damola et al. | |
| 2009/0192992 A1 | 7/2009 | Arthursson | |
| 2009/0193057 A1 | 7/2009 | Maes | |
| 2009/0193433 A1 | 7/2009 | Maes | |
| 2009/0201917 A1 | 8/2009 | Maes et al. | |
| 2009/0222541 A1* | 9/2009 | Monga et al. | 709/222 |
| 2009/0222858 A1* | 9/2009 | Hjelm et al. | 725/47 |
| 2009/0306834 A1 | 12/2009 | Hjelm et al. | |
| 2009/0328051 A1 | 12/2009 | Maes | |
| 2010/0037157 A1 | 2/2010 | Chang et al. | |
| 2010/0049640 A1 | 2/2010 | Maes | |
| 2010/0049826 A1 | 2/2010 | Maes | |
| 2010/0058436 A1 | 3/2010 | Maes | |
| 2010/0070447 A1 | 3/2010 | Pfuntner et al. | |
| 2010/0077082 A1* | 3/2010 | Hession et al. | 709/227 |
| 2010/0083285 A1 | 4/2010 | Bahat et al. | |
| 2010/0091764 A1 | 4/2010 | Merino Gonzalez et al. | |
| 2010/0128696 A1 | 5/2010 | Fantini et al. | |
| 2010/0153865 A1 | 6/2010 | Barnes et al. | |
| 2010/0185772 A1 | 7/2010 | Wang et al. | |
| 2010/0192004 A1 | 7/2010 | Bauchot et al. | |
| 2010/0281488 A1 | 11/2010 | Krishnamurthy et al. | |
| 2011/0035443 A1 | 2/2011 | Jensen | |
| 2011/0125909 A1 | 5/2011 | Maes | |
| 2011/0125913 A1 | 5/2011 | Maes | |
| 2011/0126261 A1 | 5/2011 | Maes | |
| 2011/0134804 A1 | 6/2011 | Maes | |
| 2011/0134843 A1 | 6/2011 | Noldus et al. | |
| 2011/0142211 A1 | 6/2011 | Maes | |
| 2011/0145278 A1 | 6/2011 | Maes | |
| 2011/0145347 A1 | 6/2011 | Maes | |
| 2011/0182205 A1* | 7/2011 | Gerdes et al. | 370/254 |
| 2011/0258619 A1 | 10/2011 | Wookey | |
| 2011/0280383 A1 | 11/2011 | Varga et al. | |
| 2012/0045040 A1 | 2/2012 | Maes | |
| 2012/0047506 A1 | 2/2012 | Maes | |
| 2012/0106728 A1 | 5/2012 | Ghaffari et al. | |
| 2012/0173745 A1 | 7/2012 | Maes | |

OTHER PUBLICATIONS

U.S. Appl. No. 11/848,347, filed Aug. 31, 2007, Final Office Action mailed Mar. 7, 2011, 21 pages.

U.S. Appl. No. 11/926,738, filed Oct. 29, 2007, Final Office Action mailed Mar. 17, 2011, 13 pages.

U.S. Appl. No. 11/943,101, filed Nov. 20, 2007, Final Office Action mailed Feb. 14, 2011, 11 pages.

U.S. Appl. No. 12/544,459, filed Aug. 20, 2009, Office Action dated Mar. 2, 2011, 10 pages.

U.S. Appl. No. 10/855,999, filed May 28, 2004, Advisory Action dated Mar. 16, 2011, 3 pages.

U.S. Appl. No. 11/024,160, filed Dec. 27, 2004, Office Action dated Feb. 7, 2011, 11 pages.

U.S. Appl. No. 11/939,705, filed Nov. 14, 2007, Final Office Action mailed Mar. 17, 2011, 21 pages.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Final Office Action Mailed May 10, 2010, 15 pages.

U.S. Appl. No. 11/877,129, filed Oct. 23, 2007, Advisory Action mailed Jun. 3, 2010, 2 pages.

U.S. Appl. No. 11/926,738, filed Oct. 29, 2007, Final Office Action mailed Jun. 29, 2010, 12 pages.

U.S. Appl. No. 11/951,500, filed Dec. 6, 2007, Advisory Action mailed Jun. 24, 2010, 2 pages.

U.S. Appl. No. 10/855,999, filed May 28, 2004, Office Action dated Jun. 24, 2010, 20 pages.

U.S. Appl. No. 11/024,160, filed Dec. 2004, Maes.

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Single Sign on Deployment Guide, Introduction to Single-Sign-On, Netscape 6 Documentation Training Manual http://developer.netscape.com/docs/manuals/security/SSO/sso.htm on May 26, 2003, 5 Pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

U.S. Appl. No. 11/848,347, filed Aug. 31, 2007, Office Action mailed Oct. 29, 2009, 12 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 9 pages.

U.S. Appl. No. 11/951,500, filed Dec. 6, 2007, Final Office Action mailed Mar. 30, 2010, 26 pages.

U.S. Appl. No. 11/951,500, filed Dec. 6, 2007, Office Action mailed Sep. 22, 2009, 24 pages.

U.S. Appl. No. 12/019,299, filed Jan. 24, 2008, Office Action mailed Mar. 31, 2010, 13 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 11/070,317, filed Mar. 1, 2005, Advisory Action dated May 19, 2009, 3 pages.

U.S. Appl. No. 11/070,317, filed Mar. 1, 2005, Final Office Action dated Feb. 2, 2010, 8 pages.

U.S. Appl. No. 11/070,317, filed Mar. 1, 2005, Final Office Action dated Mar. 4, 2009, 16 pages.

U.S. Appl. No. 11/070,317, filed Mar. 1, 2005, Office Action dated Apr. 30, 2010, 9 pages.

(56) References Cited

OTHER PUBLICATIONS

U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/969,343, filed Jan. 4, 2008, Office Action mailed Jun. 10, 2011, 13 pages.
U.S. Appl. No. 12/019,335, filed Jan. 24, 2008, Office Action dated May 23, 2011, 18 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/544,484, filed Aug. 20, 2009, Office Action dated Jun. 3, 2011, 6 pages.
Burger, E. et al., "Deploying CCXML for Application—Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.

(56) References Cited

OTHER PUBLICATIONS

U.S. Appl. No. 11/939,705, filed Nov. 14, 2007, Final Office Action mailed Mar. 15, 2012, 16 pages.
U.S. Appl. No. 11/939,705, filed Nov. 14, 2007, Advisory Action mailed Jun. 1, 2012, 9 pages.
U.S. Appl. No. 12/019,335, filed Jan. 24, 2008, Advisory Action mailed Feb. 27, 2012, 3 pages.
U.S. Appl. No. 11/357,653, filed Feb. 16, 2006, Office Action dated Apr. 26, 2012, 18 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 13/416,413, filed Mar. 9, 2012, Office Action mailed Apr. 27, 2012, 11 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 11/357,653, filed Feb. 16, 2006, Non-final Office Action dated Jul. 11, 2013, 26 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010 Non-Final Office Action mailed Oct. 1, 2013, 10 pages.
U.S. Appl. No. 10/855,999, filed May 28, 2004, Final Office Action dated Nov. 18, 2013, 14 pages.
U.S. Appl. No. 11/357,653, Non Final Office Action mailed on Mar. 27, 2014, 19 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on Jul. 3, 2013, 6 pages.
U.S. Appl. No. 12/019,335, Non Final Office Action mailed on Jul. 26, 2013, 19 pages.
U.S. Appl. No. 12/544,484, Non Final Office Action mailed on May 8, 2014, 13 pages.
U.S. Appl. No. 12/791,129, Advisory Action mailed on Mar. 6, 2014, 3 pages.
U.S. Appl. No. 12/791,129, Notice of Allowance mailed on Apr. 24, 2014, 9 pages.
U.S. Appl. No. 12/949,183, Final Office Action mailed on Jan. 21, 2014, 16 pages.
U.S. Appl. No. 12/949,183, Advisory Action mailed on Apr. 10, 2014, 3 pages.
U.S. Appl. No. 12/957,697, Non-Final Office Action mailed on Mar. 20, 2014, 12 pages.
U.S. Appl. No. 12/957,740, Final Office Action mailed on Feb. 19, 2014, 18 pages.
U.S. Appl. No. 13/029,219, Non Final Office Action mailed on Apr. 11, 2014, 23 pages.
U.S. Appl. No. 13/029,226, Final Office Action mailed on Jan. 30, 2014, 12 pages.
U.S. Appl. No. 13/029,226, Advisory Action mailed on Apr. 7, 2014, 3 pages.
U.S. Appl. No. 12/948,247, Non-Final Office Action mailed on May 21, 2014, 18 pages.
U.S. Appl. No. 12/957,740, Advisory Action mailed on May 23, 2014, 3 pages.
U.S. Appl. No. 13/029,226, Non-Final Office Action mailed on May 22, 2014, 12 pages.
U.S. Appl. No. 12/957,697, Advisory Action mailed on May 29, 2014, 2 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/957,697, Non-Final Office Action mailed on Jul. 2, 2014, 9 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable learning repositories, Proceedings of the 1st Workshop on Interoperability of Web-based Educational Systems, 2005, pp. 11-18.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/939,705, filed Nov. 14, 2007, Office Action mailed Jul. 6, 2012, 13 pages.
U.S. Appl. No. 12/364,642, filed Feb. 3, 2009, Final Office Action dated Jun. 19, 2012, 24 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.

(56) References Cited

OTHER PUBLICATIONS

U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 12/019,335, filed Jan. 24, 2008, Final Office Action mailed Jan. 14, 2014, 33 pages.
U.S. Appl. No. 11/357,653, filed Feb. 16, 2006, Final Office Action dated Nov. 26, 2013, 25 pages.
U.S. Appl. No. 11/969,343, filed Jan. 4, 2008, Notice of Allowance mailed Jan. 16, 2014, 6 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Final Office Action mailed Dec. 20, 2013, 10 pages.
U.S. Appl. No. 12/949,287, filed Nov. 18, 2010, Final Office Action mailed Nov. 25, 2013, 25 pages.
U.S. Appl. No. 13/029,219, filed Feb. 17, 2011, Advisory Action mailed Jan. 2, 2014, 3 pages.

* cited by examiner

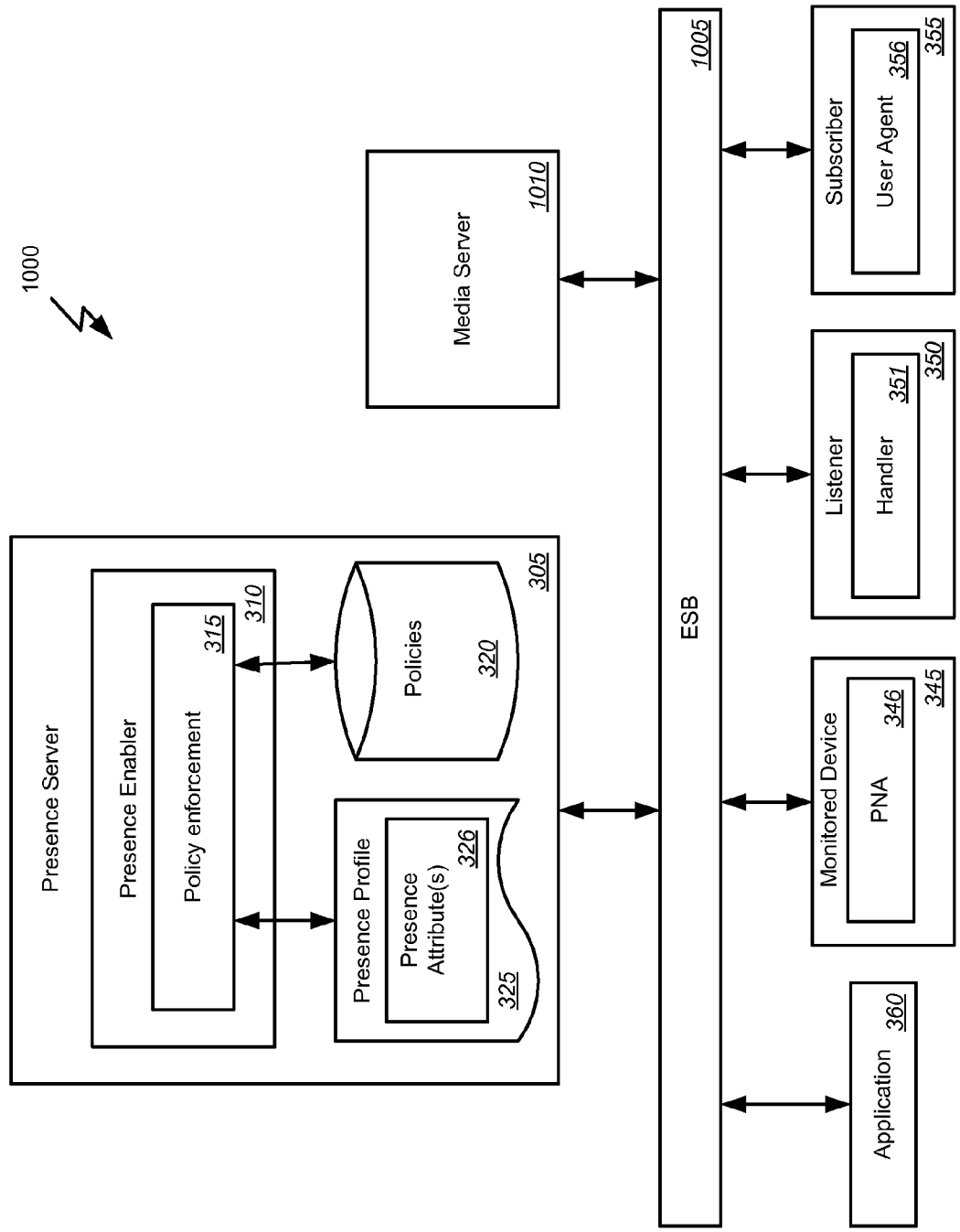

PRESENCE-BASED EVENT DRIVEN ARCHITECTURE

CROSS-REFERENCES TO RELATED APPLICATIONS

Background of the Invention

Embodiments of the present invention relate generally to methods and systems for monitoring of systems, devices, or agents and more particularly to using a presence-based network for monitoring of systems, devices, or agents.

As the pace of business increases, companies are being forced to more quickly sense and respond to changes, threats and opportunities in the markets they serve, their supply chain and their internal operations. Each of these changes, threats and opportunities manifests itself as an event, i.e., a record of something that has happened. An Event-Driven Architecture (EDA) is an architectural paradigm based on using events as triggers that initiate the delivery of a message that informs numerous recipients about the event so they can take appropriate action. When used with event management, the collection of events can be analyzed and correlated to identify relevant patterns or non-patterns, and then aggregated to build up information that is needed to proactively prevent future problems. An EDA can be implemented on or using an Enterprise Service Bus (ESB). Generally speaking, an ESB is a framework built upon any of a variety of different standard or propriety protocols for interconnecting and providing communications between elements (i.e., applications, devices, systems, etc.) of an architecture such as an EDA.

However, such systems present problems in their implementation. For example, it is complicated to develop an EDA and integrate it with applications and/or middleware. Additionally, it is complicated to manage appropriate real-time performances of the EDA and minimize delay in handling events and responses. Furthermore, scalability/extensibility of an EDA can be limited or at least very difficult. Also, EDA systems are stateless. That is, they treat each transaction as independent and do not persist the transaction beyond its initial handling. Hence, there is a need for improved methods and systems for monitoring of systems, devices, or agents in a real-time or other system.

BRIEF SUMMARY OF THE INVENTION

Embodiments of the invention provide systems and methods for using a presence-based network to monitor systems, devices, or agents. For example, embodiments of the present invention provide for use of a presence network to implement systems such as an event driven architecture. Since presence data models as used with eXtensible Messaging and Presence Protocol (XMPP), Session Initiation Protocol (SIP), SIP Instant Messaging and Presence Leveraging Extensions (SIP/SIMPLE), Open Mobile Alliance (OMA) SIP/SIMPLE presence eXtensible Markup Language (XML) Document Management (XDM) enablers etc. are extensible (i.e. new attributes can be defined), a presence attribute can be defined for any type of information of a system to be monitored that can then be used, i.e., published/subscribed, as with other presence attributes. However, it should be noted that embodiments of the present invention are not limited to use with SIP/SIMPLE, XMPP, or any other specific protocol. Rather, embodiments of the present invention can be implemented using any other presence solution including, for example, Instant Messaging and Presence Service (IMPS)/Wireless village, Parlay/Network presence, and presence associated with Multimedia IM messages like Skype, Google Talk, MSN messenger, Y!, AIM etc.

Regardless of the exact protocols and/or presence solution used, when the information of the monitored system changes or another event occurs, the presence attributes in the presence profile of that system can be updated and the update can be published to authorized subscribers, for example via a presence server. It should be understood that the attributes can be generalized in many different ways and need not be limited to a state or status of a monitored device or process. Rather, the attributes can be any multimedia document (e.g. XML or "XMLized" binary documents) or a URI to one or more documents or streams.

According to one embodiment, a system can comprise a presence network agent. The presence network agent can be adapted to publish one or more presence attributes which can comprise at least one attribute indicating information other than presence information. Presence information is that information indicating a transient state of an entity that can be used by others to determine how to best contact that entity. A presence server can be communicatively coupled with the presence network agent. The presence server can be adapted to receive the published presence attributes and update a presence profile associated with the presence network agent based on the received presence attributes. The presence server can also be adapted to apply one or more policies. In such cases, updating the presence profile associated with the presence network agent based on the received presence attributes can be further based on the one or more policies. According to one embodiment, when implemented with OMA SIP/SIMPLE these functions can be split between XDM enablers and presence enablers.

The system can further comprise a listener communicatively coupled with the presence server and adapted to receive presence attributes from the presence server. The presence server can be adapted to provide at least one of the one or more presence attributes of the presence profile associated with the presence network agent to the listener. Providing at least one of the one or more presence attributes to the listener can be based on the presence server applying one or more policies. For example, the listener can be adapted to subscribe to one or more presence attributes of the presence profile associated with the presence network agent. In such a case, the presence server can provide the subscribed presence attributes to the listener by providing a notification of a change in the at least one presence attribute. In another example, the listener can be adapted to request the presence attributes from the presence server. In such a case, the presence server can provide the presence attribute to the listener in response to the request. In either case, the listener can comprise a handler adapted to process the presence attributes received from the presence server.

The information other than presence information can comprise, for example, event information from or a status of the monitored system or process. Additionally or alternatively, the information other than presence information can comprise, for example, a multimedia document, a URI to a document or stream, etc. In the case of event information, the presence server can be further adapted to provide or implement an Event Driven Architecture (EDA) based on the event information. The EDA can be adapted to provide real-time monitoring of a device associated with the presence network agent. In some cases, the presence attributes can further comprise at least one attribute indicating presence information. So, for example, the EDA can provide tracking of the device, e.g., a Radio Frequency IDentification (RFID) tag, associated with the presence network agent based on the at least one attribute indicating presence information (e.g., a sensor on a device/user to provide presence information when the user is "manning" the device). In another example, the device associated with the presence network agent can comprise a sensor and the EDA can be adapted to perform process monitoring based on at least one of the presence attributes. In still another example, the EDA can be adapted to provide real-time monitoring of a process associated with the presence network agent and provide a notification of a change in status of the process based on one or more of the presence attributes.

According to another embodiment, a method of monitoring a system can comprise receiving a publication of one or more presence attributes from a presence network agent. The presence attributes can comprise at least one attribute indicating information other than presence information. A presence profile associated with the presence network agent can be updated based on the received presence attributes. One or more policies can be applied to the presence attributes. Updating the presence profile associated with the presence network agent can be based on applying the one or more policies. At least one of the one or more presence attributes of the presence profile associated with the presence network agent can be provided to a listener. Providing the presence attributes to the listener can also be based at least in part on applying the one or more policies. For example, providing at least one of the one or more presence attributes of the presence profile associated with the presence network agent to the listener can comprise providing a notification of a change in the at least one presence attribute. Additionally or alternatively, a request can be received from the listener for at least one of the one or more presence attributes of the presence profile associated with the presence network agent and the at least one presence attribute to the listener can be provided in response to the request.

In some cases, the information other than presence information can comprise event information. In such cases, an Event Driven Architecture (EDA) can be provided or implemented based on the event information. For example, providing the EDA can comprise providing real-time monitoring of a device, system, or application associated with the presence network agent. In some cases, the presence attributes can further comprise at least one attribute indicating presence information. Generally, such an EDA can, via Short Message Peer-to-Peer (SMPP) protocol, Java Management Extensions (JMX), or other monitoring protocol, provide an event or indication of an event to the presence network agent which in turn provides the event of indication of the event to the presence server to be published as a presence attribute to one or more subscribers and/or otherwise provided to one or more authorized users/monitors. So, for example, providing the EDA can comprise providing tracking of the device associated with the presence network agent based on the at least one attribute indicating presence information. In another example, the device associated with the presence network agent can comprise a sensor. In such cases, providing the EDA can comprise performing process monitoring based on at least one of the presence attributes. In yet another example, providing the EDA can comprise providing real-time monitoring of a process associated with the presence network agent and providing a notification of a change in status of the process based on one or more of the presence attributes.

In yet another embodiment, a machine-readable medium can have stored thereon a series of instructions which, when executed by a processor, cause the processor to monitor a system by receiving a publication of one or more presence attributes from a presence network agent. The presence attributes can comprise at least one attribute indicating information other than presence information. A presence profile associated with the presence network agent can be updated based on the received presence attributes. At least one of the one or more presence attributes of the presence profile associated with the presence network agent can be provided to a listener. A presence profile associated with the presence network agent can be updated based on the received presence attributes. One or more policies can be applied to the presence attributes. Updating the presence profile associated with the presence network agent can be based on applying the one or more policies. At least one of the one or more presence attributes of the presence profile associated with the presence network agent can be provided to a listener. Providing the presence attributes to the listener can also be based at least in part on applying the one or more policies.

For example, providing at least one of the one or more presence attributes of the presence profile associated with the presence network agent to the listener can comprise providing a notification of a change in the at least one presence attribute. Additionally or alternatively, a request can be received from the listener for at least one of the one or more presence attributes of the presence profile associated with the presence network agent and the at least one presence attribute to the listener can be provided in response to the request. In one implementation, the information other than presence information can comprise event information. In such a case, an Event Driven Architecture (EDA) can be implemented based on the event information. In such an EDA or in other embodiments of the present invention, the listener or other element monitoring the system or element(s) of the system can therefore comprise simple client devices such as cell phones, pagers, etc that are commonly adapted to use presence information. That is any client device able to receive a notification of a change in the presence attributes or query to obtain the presence attributes can be used in the EDA or other embodiments of the present invention to monitor various devices, systems, applications, etc.

According to still another embodiment, a stateful Event Driven Architecture (EDA) can comprise a network, a monitored device, a profile associated with the monitored device, the profile comprising one or more attributes associated with monitored information, and a policy enforcement module adapted to persist one or more of the attributes based on one or more policies. The policy enforcement module can be further adapted to expire one or more of the attributes based on the one or more policies. The profile can comprise a presence profile and the attributes can comprise presence attributes. In some cases, the EDA can further comprise a stateful Enterprise Service Bus (ESB).

For example, the EDA can comprise a presence server communicatively coupled with the network and can be adapted to receive the one or more presence attributes via the network and update the presence profile based on the received presence attributes. The monitored device can comprise a presence network agent adapted to publish the one or more presence attributes to the presence server. The presence network agent can be adapted to receive monitored information from the network and publish the one or more presence attributes in response to receiving the monitored information. Additionally or alternatively, the presence network agent can be adapted to request monitored information from the network, receive the monitored information in response to the request, and publish the one or more presence attributes in response to receiving the monitored information.

The EDA can further comprise a listener communicatively coupled with the presence server and adapted to receive presence attributes from the presence server. The listener can be adapted to subscribe to the at least one of the one or more presence attributes of the presence profile. The presence server can provide the at least one presence attribute to the listener by providing a notification of a change in the at least one presence attribute. Additionally or alternatively, the listener can be adapted to request the presence attributes from the presence server and he presence server can provide the at least one presence attribute to the listener in response to the request. The listener can comprise a handler adapted to process the presence attributes received from the presence server.

BRIEF DESCRIPTION OF THE DRAWINGS

FIG. 10 is a block diagram illustrating, at a high-level, functional components of a system for monitoring a system according to an alternative embodiment of the present invention.

DETAILED DESCRIPTION OF THE INVENTION

Figure 1:
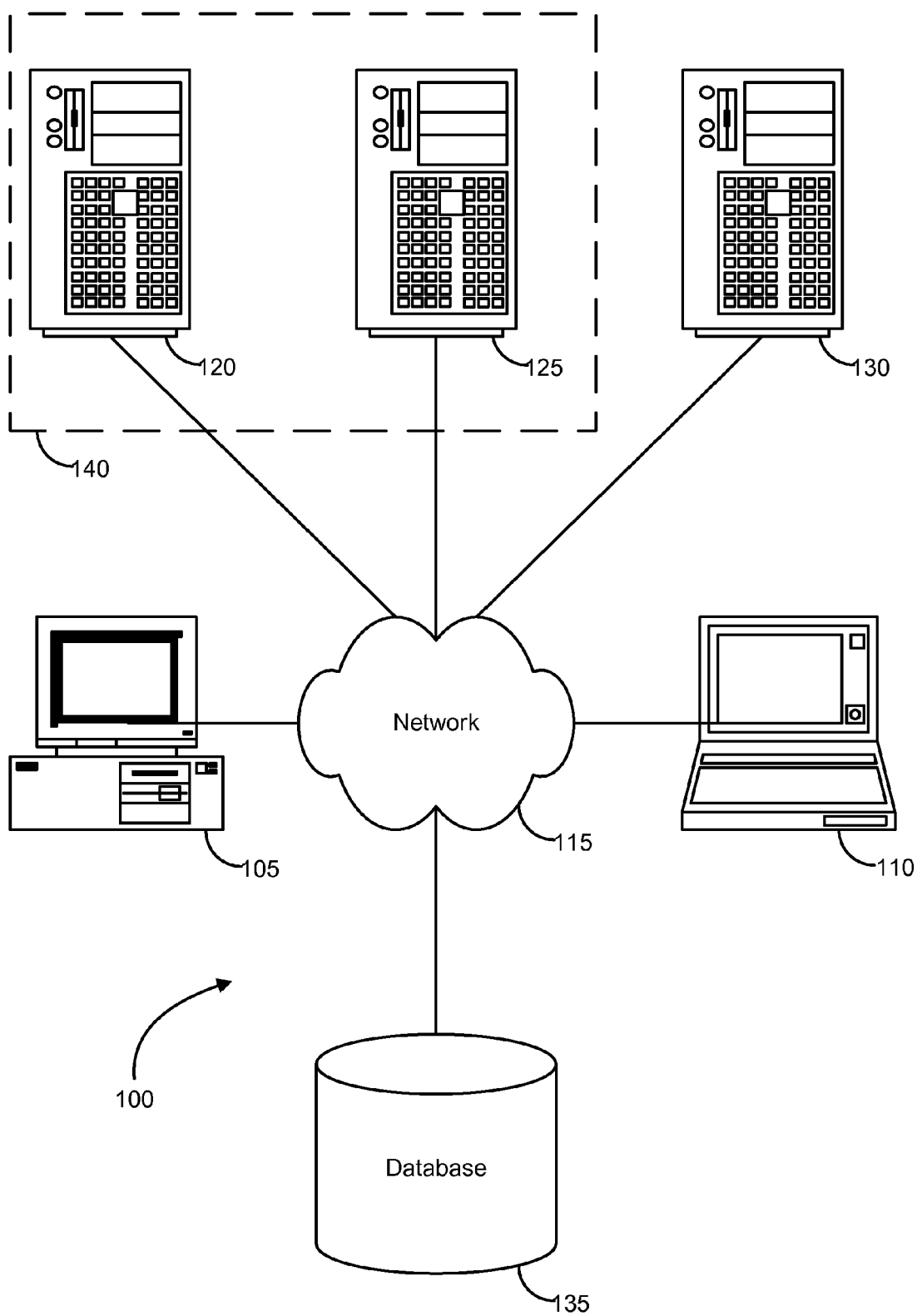
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for using a presence-based network for monitoring of systems, devices, or agents. More specifically, embodiments of the present invention provide for use of a presence network to implement systems such as an Event Driven Architecture (EDA) by extending a presence profile to include attributes indicating information other than or in addition to presence information. Presence information as conventionally defined is a transient state of a principal that can be used by other entities to make a decision about how to best communicate with the principal. A principal can be defined as an entity that has an identity, that is capable of providing consent and other data, and to which authenticated actions are done on its behalf. Thus, as will be described in detail below, a principal, referred to herein as a monitored system or device, can be any device, system, agent, application, individual, etc. Furthermore, the presence attributes described herein are not limited to identifying or indicating presence information. Rather, embodiments of the present invention provide for using presence attributes to identify or indicate any type of information related to the principal. For example, such information can include but is not limited to a state or status of a device or process, a reading or measurement from a device such as a sensor, information collected or generated by an application or process, etc, as well as presence information. Additionally or alternatively, information indicated by the presence attributes can include other types of information. For example, information indicated by one or more presence attributes can include but is not limited to a multimedia document, a Uniform Resource Identifier (URI) to a document of stream, etc.

Since presence data models as used with Extensible Messaging and Presence Protocol (XMPP), Session Initiation Protocol (SIP), SIP Instant Messaging and Presence Leveraging Extensions (SIMPLE), OMA SIP/SIMPLE presence XML Document Management (XDM) enablers etc. are extensible (i.e. new attributes can be defined), a presence attribute can be defined for any type of information of a device, system, agent, or other entity to be monitored that can then be used, i.e., published/subscribed. However, as noted above, embodiments of the present invention are not limited to use with SIP/SIMPLE, XMPP, or any other specific protocol. Rather, embodiments of the present invention can be implemented using any other presence solution including, for example, Instant Messaging and Presence Service (IMPS)/Wireless village, Parlay/Network presence, and presence associated with Multimedia IM messages like Skype, Google Talk, MSN messenger, Y!, AIM etc. Regardless of the exact protocol and/or presence solution used, presence information can be obtained using a subscribe/publish model wherein a principal publishes presence attributes to a presence server which in turn notifies authorized subscribers, referred to herein as listeners, of the information or change of information. Thus, when the information of the monitored system changes or another event occurs, the presence attributes in the presence profile of that system can be updated and the update can be published to authorized listeners via a presence server. Additionally or alternatively, presence information can be obtained from the presence server by the listener interrogating or querying the server which in turn responds to the query. According to one embodiment, presence information can additionally or alternatively be published by a presence network agent. Such a presence network agent can additionally or alternatively be adapted to monitor the system or elements of the system by receiving notifications or querying the system for presence attributes.

As will be described below, updating the presence profile, notifying subscribers/listeners, and/or responding to queries, etc. can be subject to the application of one or more policies by the presence server. As used herein the term policy refers to a combination of one or more conditions and a set of one or more associated actions to be performed upon the condition(s) being satisfied. That is, the policies can define conditions to be met and corresponding actions to be taken when receiving a publication of a presence attribute, notifying subscribers/listeners, responding to queries, etc. For example, the policies can define which subscribers or listeners are authorized to receive a notification or access a presence profile or attribute. Additionally or alternatively, the policies can define conditions and actions for use by the presence service to determine what information is shown to who, how is it transformed, under what conditions etc. Other possible policies, i.e., any combination of any condition and any action, are contemplated and considered to be within the scope of the present invention. According to one embodiment, application of policies, handling of events, and implementation of the attributes can be performed as described in U.S. patent application Ser. No. 11/424,451 filed Jun. 15, 2006 by Maes and entitled "Past Presence Hints" the entire disclosure of which is incorporated herein by reference for all purposes. That is, presence attributes as described herein can represent past presence hints or information as described in the referenced application and can be treated according to the embodiments described therein including but not limited to possible expiration of attributes etc.

As noted above and as will be described in detail below, systems built or implemented using embodiments of the present invention can include but are not limited to an EDA. Generally speaking an EDA implemented on a presence network according to embodiments of the present invention can provide for handling an event published as a presence attribute by a principal. So for example, a presence agent or other event source can publish a presence attribute indicating an event and/or other information to a presence server. The presence server, based on the application of policies, can handle the event by notifying one or more listeners/subscribers. That is, the presence server can apply one or more policies to determine which listeners/subscribers to inform or notify, whether and/or how to transform the event, etc. The presence server can then provide the presence attributes to the listener/subscribers based on the applied policies. Each or some of the listeners can include a handler for further processing or handling of the event notification. Systems implemented in this way can include, by way of example and not limitation, systems for monitoring and/or controlling a system, process, application, etc., systems for handling or controlling communications, etc.

As will be described, embodiments of the present invention can implement an Enterprise Service Bus (ESB). According to one embodiment, when implementing an ESB on a presence based EDA, listeners on the bus can subscribe to sources/attributes. The presence server can transform incoming events based on policies or may give raw outputs. In such cases, handlers can perform any dedicated transformation as appropriate. According to one embodiment, application of policies by the presence server can be performed in accordance with embodiments described in the application entitled Past Presence Hints referenced above to provide or control expiration of presence attributes. Accordingly, expiration of state information or other presence attributes can occur instantly or after some amount of time. That is, a "stateful" EDA can be implemented in which state and/or attribute persistence can be managed or expired to provide no persistence or some persistence based on the policies defined. Therefore, a notion of an EDA including persistence and/or a persistent ESB and the possibilities provided thereby are described. Additional details of various embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g. the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
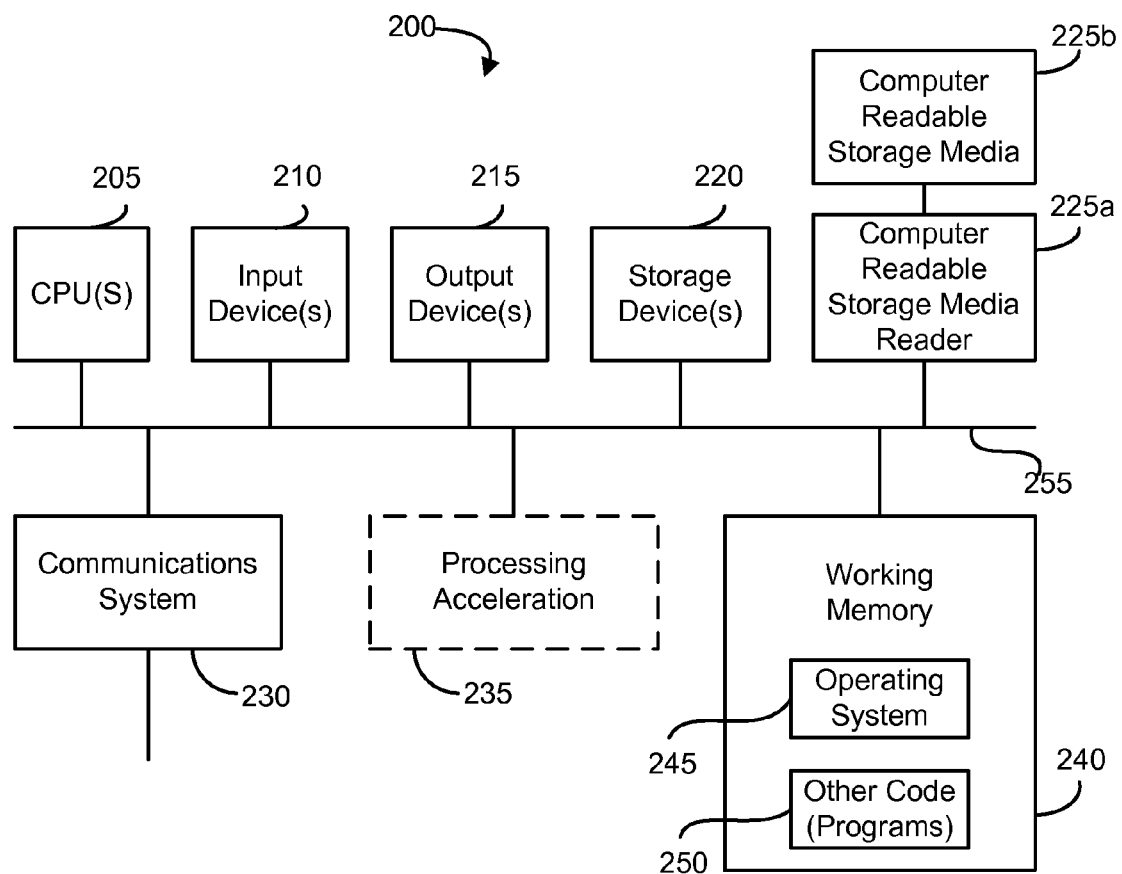
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
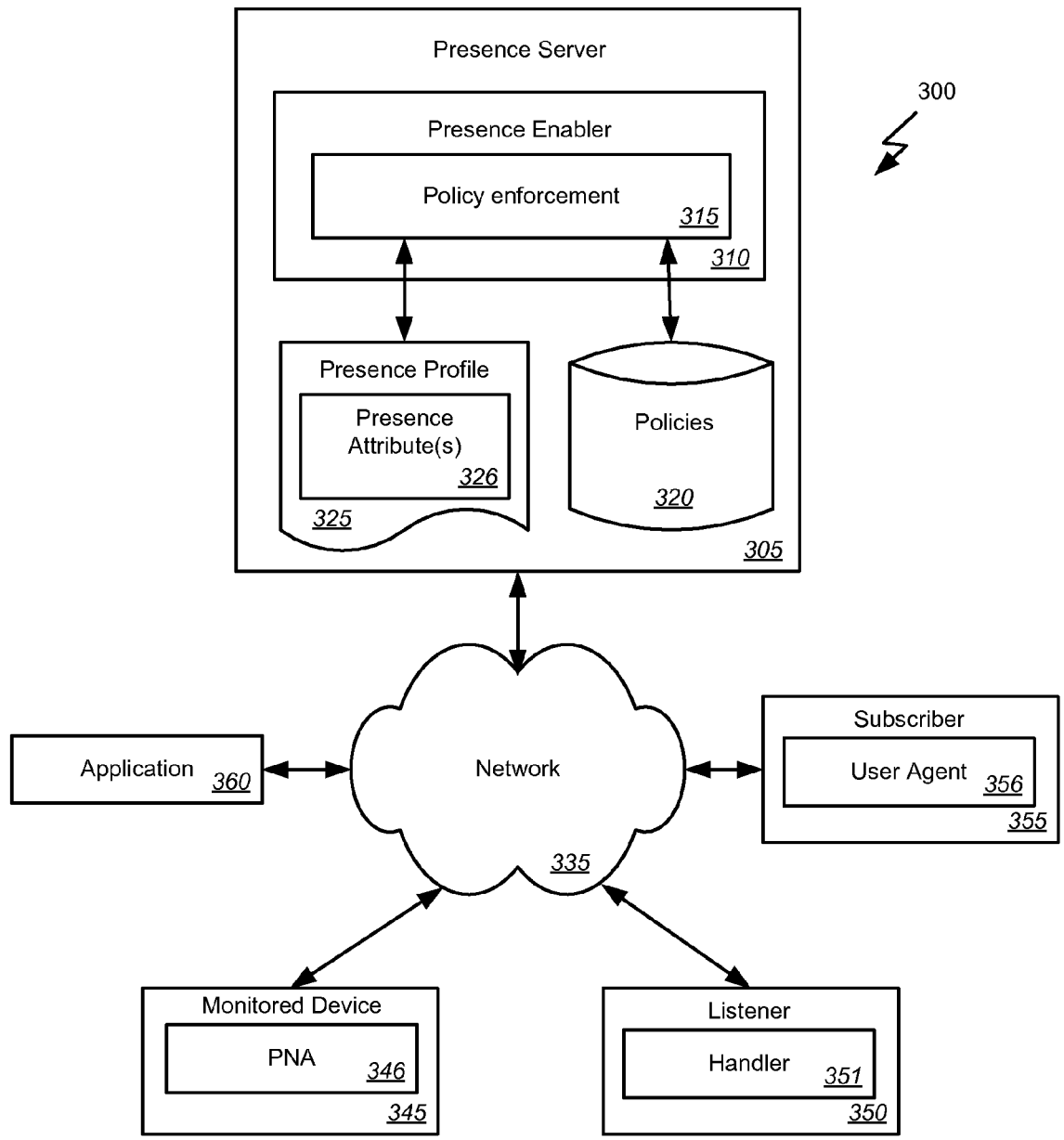
FIG. 3 is a block diagram illustrating, at a high-level, functional components of a system for monitoring a system according to one embodiment of the present invention.

FIG. 3 is a block diagram illustrating, at a high-level, functional components of a system for monitoring a system according to one embodiment of the present invention. Generally speaking, the system 300 of this example illustrates a presence network that can be adapted to provide for monitoring of systems, devices, or agents. More specifically, the system 300 includes a communications network 335. The communications network 335 can comprise any type of network such as described above. A number of devices 345 and 350 can be communicatively coupled with the communications network 335. The devices 345 and 350 can include a monitored device 345 and a listener 350. Additionally or alternatively, the system 300 can include an application 360 and/or another subscriber 355 device or system 355 communicatively coupled with the communications network 335.

Generally speaking, the monitored device 345 can comprise any device, system, application, etc. that is to be monitored and the listener 350 can be any device, system, application etc that can receive and/or react to information provided by or relating to the monitored device 345. It should be noted that the names monitored device and listener are used only to illustrate a particular device's function at a given time and are not meant to imply any limitations on the functions that can be performed by a given device. That is, any given device, system, or application can alternately or concurrently act as a monitored device 345 or listener 350.

The system can also include a presence server 305 communicatively coupled with the communications network 335. The presence server 305 can include a presence enabler 310. It should be noted that the presence enabler 310 can comprise any one or more of a number of different enablers. For example, the presence enabler 310 can comprise an XDM enabler, a Resource List Server (RLS) enabler, or other presence enabler. Furthermore, multiple enablers may be utilized and provide internal decomposition of functions between the different enablers. Any or all such enablers are considered to be represented by presence enabler 310 and are considered to be within the scope of the present invention. It should be noted and understood that, while described herein with reference to OMA SIP/SIMPLE presence and XDM enablers, other presence server approaches can be used depending upon the exact implementation and are considered to be within the scope or the present invention. Furthermore, embodiments of the present invention do not depend upon any particular technology for implementing the presence enabler, presence server, or the presence network and the exact technology used can vary depending upon the implementation without departing from the scope of the present invention.

As noted above, the presence service provided via the presence enabler 310 of the presence server 305 can maintain a set of presence profiles 325 for any number of principals participating in the service. For example, a presence profile 325 can be maintained for or related to the monitored device 345. The presence profile 325 can include a set of one or more presence attribute 326. The presence attributes 326 can include attributes identifying or related to presence information as noted above. However, the presence attributes 326 described herein are not limited to identifying or indicating presence information. Rather, embodiments of the present invention provide for using presence attributes 326 to identify or indicate any type of information related to the principal such as the monitored device 345. For example, such information can include but is not limited to a state or status, information collected or generated by an application or process, etc, as well as presence information. Additionally or alternatively, information indicated by the presence attributes can include other types of information. For example, information indicated by one or more presence attributes can include but is not limited to a multimedia document, a Uniform Resource Identifier (URI) to a document of stream, etc.

The monitored device 345 can be adapted to maintain or execute a presence agent 346. The presence agent 346 can be adapted to publish one or more presence attributes 326 to the presence profile 325 maintained by the presence server 305 and associated with the monitored device and/or presence agent 346. As noted above, the presence attribute(s) 326 published to the presence server 305 by the presence network agent 346 can comprise at least one attribute indicating information other than presence information. For example, such information can comprise state or status information of the monitored device 345 or process thereof, a reading or measurement from the monitored device 345 such as a sensor reading or measurement, information collected or generated by an application or process of the monitored device 345, etc.

The presence attributes 326 can be published to the presence server 305 by the presence agent 345 via any appropriate method, message, or signal of the underlying protocol of the communications network 335. For example, embodiments of the present invention, while not so limited, may be implemented on Session Initiation Protocol (SIP)/SIP Instant Messaging and Presence Leveraging Extensions (SIMPLE). In such cases, the presence network agent 346 can publish the presence attributes using the known SIP/SIMPLE "PUBLISH" method. However, it should be understood that use of this protocol and method is offered by way of example only and not limitation. In other implementations, various other protocols and methods may be used.

The presence server 305 can be adapted to receive the published presence attribute(s) 326 and update the presence profile 325 associated with the presence network agent 346 based on the received presence attribute(s) 326. The presence server 305, for example via policy enforcement module 315 of the presence enabler 3160, can also be adapted to apply one or more policies 320. In such cases, updating the presence profile 325 associated with the presence network agent 346 based on the received presence attribute(s) 326 can be further based on the one or more policies 320. For example, such policies can define when, how, under what conditions, etc., the presence attributes 326 can be updated.

As noted, the system 300 can also comprise a listener 350 communicatively coupled with the presence server 305 via the communications network 335. The listener can comprise any type of system, device, application, etc. and can be adapted to receive presence attributes 326 from the presence server 305. The presence server 305 can be adapted to provide at least one of the one or more presence attributes 326 of the presence profile 325 associated with the presence network agent 346 to the listener 350. For example, providing presence attributes 326 to the listener 350 can be based on a subscribe/notify model. That is, the listener 350 can be adapted to subscribe to one or more presence attributes 326 of the presence profile 325 associated with the presence network agent 346. In such a case, the presence server 305 can provide the subscribed presence attributes 326 to the listener 350 by providing a notification of a change in the presence attribute. Additionally or alternatively, the notification can be provided to application 360 and/or another subscriber 355. For example, the application 360 and/or other subscriber 355, via a user agent 356, can subscribe to the one or more presence attributes 326 of the presence profile 325 associated with the presence network agent 346 and in turn receive notification of changes in the presence attribute.

In another example, the listener 350 and/or application 360 can be adapted to request the presence attributes 326 from the presence server 305, for example via a northbound interface of the presence enabler such as an interface including but not limited to a Parlay X presence interface. The presence server 305 can provide the presence attribute 326 to the listener 350 in response to the request. The listener can include a handler 351 or other application or process for further handling of the presence attribute(s) provided by the presence server 305. That is, the handler 351 of the listener 350 may perform further processing to, for example, inform a user of the listener 350 of the attribute(s), initiate a communication, perform actions to control a process based on the attribute(s), etc.

The presence attributes 326 can be published or provided by the presence server 305 to the listener 350 via any appropriate method, message, or signal of the underlying protocol of the communications network 335. For example, embodiments of the present invention, while not so limited, may be implemented on Session Initiation Protocol (SIP). In such cases, the presence server 305 can provide the notification to the listener using the known SIP "NOTIFY" message. In another example, a request and response between the listener and presence server can be implemented using the known Hyper Text Transfer Protocol (HTTP) "GET" and "PUT" methods.

Regardless of the exact implementation, providing presence attributes to the listener 350, application 360, and/or other subscriber 355, either as a notification or in response to a request, can be based on the presence server 305 applying one or more policies 320, for example via policy enforcement module 315 of the presence enabler 310. The policies 320 can define, for example, which subscribers or listeners 350 are authorized to receive a notification or access a presence profile 325 or attribute. Additionally or alternatively, the policies 320 can define conditions and actions for use by the presence server 305 to determine what information is shown to who, how is it transformed, under what conditions etc. Other possible policies 320, i.e., any combination of any condition and any action, are contemplated and considered to be within the scope of the present invention. As noted, application of policies and handling of events can be performed as described in the application entitled "Past Presence Hints" referenced above to provide, for example, expiration of attributes etc.

Generally speaking an Event Driven Architecture (EDA) implemented on a presence network according to embodiments of the present invention can provide for handling an event published as a presence attribute 326 by a principal, i.e., by a presence network agent 346. Generally, such an EDA can provide the features and functions of a typical EDA and can include, based on the application of policies by the presence server, persistence and state management for the event. Therefore, a richer, stateful EDA and/or ESB can be implemented. So for example, a presence network agent 346 can publish a presence attribute 326 indicating an event and/or other information to a presence server 305. The presence server 305, based on the application of policies 320, can handle the event by notifying one or more listeners 350 or subscribers. Furthermore, the event can be persisted, or not, based on the application of the policies. Expiration of the events or attributes can also be managed based on policies that expire, filter, change the attributes. Each or some of the listeners 350 can include a handler 350 for further processing or handling of the event notification. Systems implemented in this way can include, by way of example and not limitation, systems for monitoring and/or controlling a system, process, application, etc., systems for handling or controlling communications, etc.

In another example, a user agent 356 operating on a subscriber device 355 can be adapted to subscribe to and receive notifications of changes to presence attributes 326 published by a principal. Thus, the user agent 356 can be adapted to monitor one or more presence attributes for administration and/or management purposes. For example, the user agent 356 can be a "watcher" that can be present on any device or application. Therefore, a status or update for a monitored system can be provided to any device that has a user agent 356 or "watcher."

In yet another example, an application 360 can be adapted to query the presence server 305 to obtain one or more presence attributes 326 of a principal. In such a case, the presence server 305 can receive the query or request from the application 360 and respond with the requested attributes. The application 360 can then use the returned attributes, for example, to test whether/when to update/report a status of the monitored system, application, device, etc. As noted, the response by the presence server 305 may be based on application on one or more policies 320. That is, the policies 320 can define whether the requester is authorized to access the presence profile 325 and/or requested attribute. Additionally or alternatively, the policies 320 can define conditions and actions for use by the presence server 305 to determine what information is shown, how is it transformed, under what conditions etc. Other possible policies, i.e., any combination of any condition and any action, are contemplated and considered to be within the scope of the present invention.

Furthermore, as noted above, the presence attributes 326 maintained by the presence server 305 can comprise other types of content, i.e., other than a state or status of a monitored system, application, device, etc. For example, the presence attributes can comprise information indicating or including a multimedia document (e.g. XML or "XMLized" binary documents). Additionally or alternatively, the presence attributes can comprise a URI to one or more documents or streams, for example, provided by or through a media server (not shown here) or other system.

As noted above, the presence server 305, based on application of the policies 320, can provide persistence and state management for the events. So for example, a presence network agent 346 can publish a presence attribute 326 indicating an event and/or other information to a presence server 305. The presence server 305, based on the application of policies 320, can handle the event by notifying one or more listeners 350 or subscribers. Furthermore, the event can be persisted, or not, based on the application of the policies 320. Therefore, when a listener 350 or subscriber 355 connects with the network 335, it can be provided with past, persisted events, if any. Such events can be persisted for a time defined by the policies after which the events are expired as described in the application entitled Past Presence hints referenced above.

Figure 4:
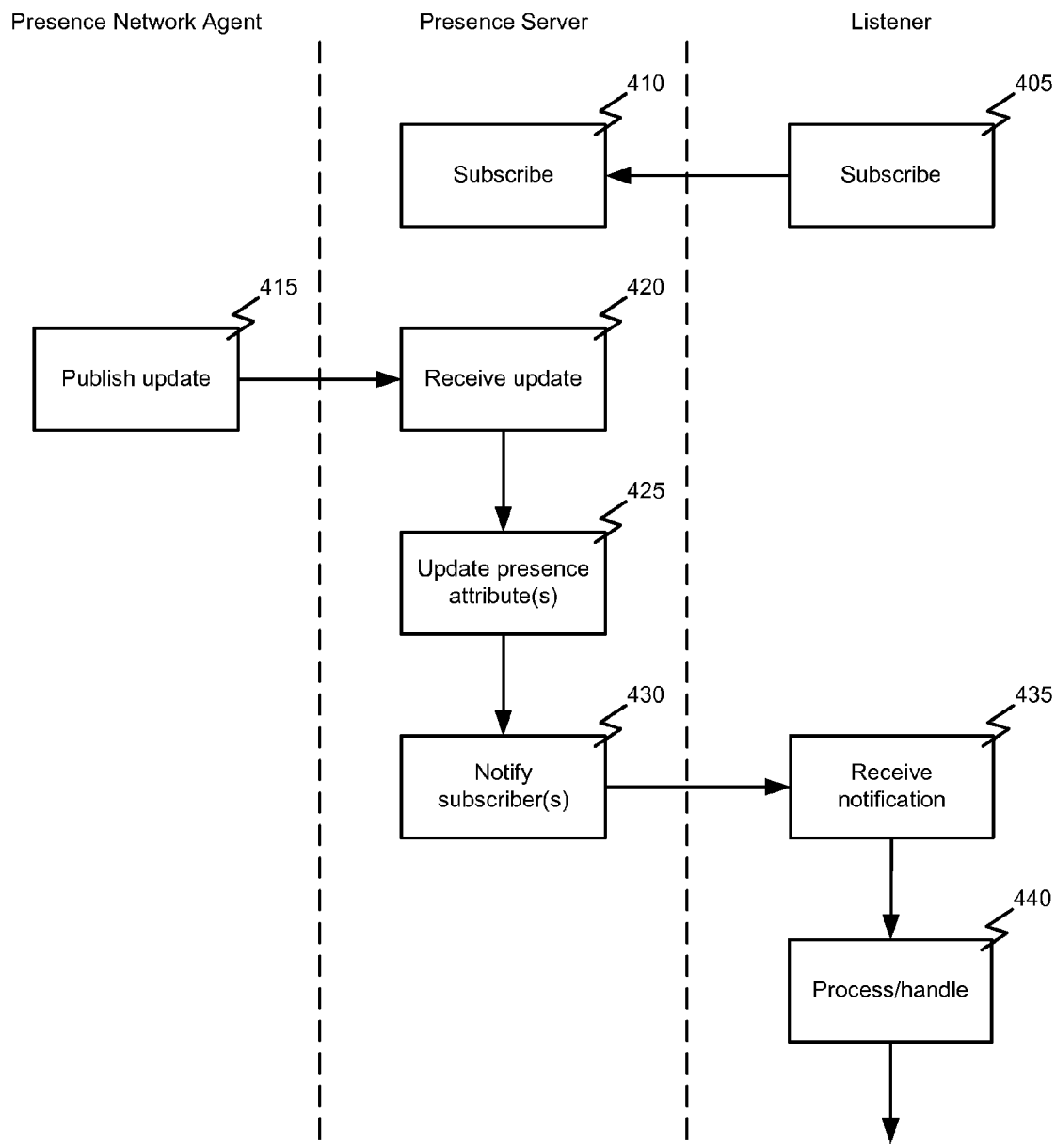
FIG. 4 is a flowchart illustrating a process for monitoring a system according to one embodiment of the present invention.

FIG. 4 is a flowchart illustrating a process for monitoring a system according to one embodiment of the present invention. In this example, the process begins with a listener subscribing 405 and 410 to one or more presence attribute of a presence profile maintained by the presence server. The subscription 405 and 410 can be performed via any appropriate message of the underlying protocol of the presence network as described herein and in a manner consistent with the implementation of the presence server. At some point thereafter, the presence network agent can publish 415 an update of one or more presence attributes indicating information relating the monitored device, system, application, etc. Again, the publication 415 can be performed via any appropriate message of the underlying protocol of the presence network as described herein.

The presence service can receive 420 the publication of one or more presence attributes from the presence network agent. A presence profile associated with the presence network agent can be updated 425 based on the received presence attributes. As noted above one or more policies can be applied to the presence attributes by the presence service. Therefore, updating 425 the presence profile associated with the presence network agent can be based on applying the one or more policies. At least one of the one or more presence attributes of the presence profile associated with the presence network agent can be provided 430 to a listener, i.e., a notification can be sent to the listener. Providing 430 the presence attributes to the listener can also be based at least in part on applying the one or more policies. That is, one or more policies can be applied to determine, for example, which listeners are to be notified, how they are to be notified, over what channels, how the attribute is to be provided, transformed, etc. The notification can be provided 430 to the listener via any appropriate message of the underlying protocol of the presence network as described herein.

The listener can receive 435 the notification from the presence server. As noted above, the listener can include a handler or other application or process for further handling 440 of the notification. That is, the listener may perform further processing 440 to, for example, inform a user of the listener of the notification, initiate a communication, perform actions to control a process based on the notification, etc.

It should be understood that the process illustrated by FIG. 4 can vary according to the implementation and is offered by way of example only. In another implementation, for example, rather than the listener subscribing 405 to and receiving 435 notification of changes to an attribute, a user agent or "watcher" as described above may be adapted to subscribe 405 to and receive 435 notification of changes to an attribute. In such a case, processing 440 the notification can comprise displaying or otherwise presenting an indication of the notification, for example, via a user interface of the "watcher" device or application.

Figure 5:
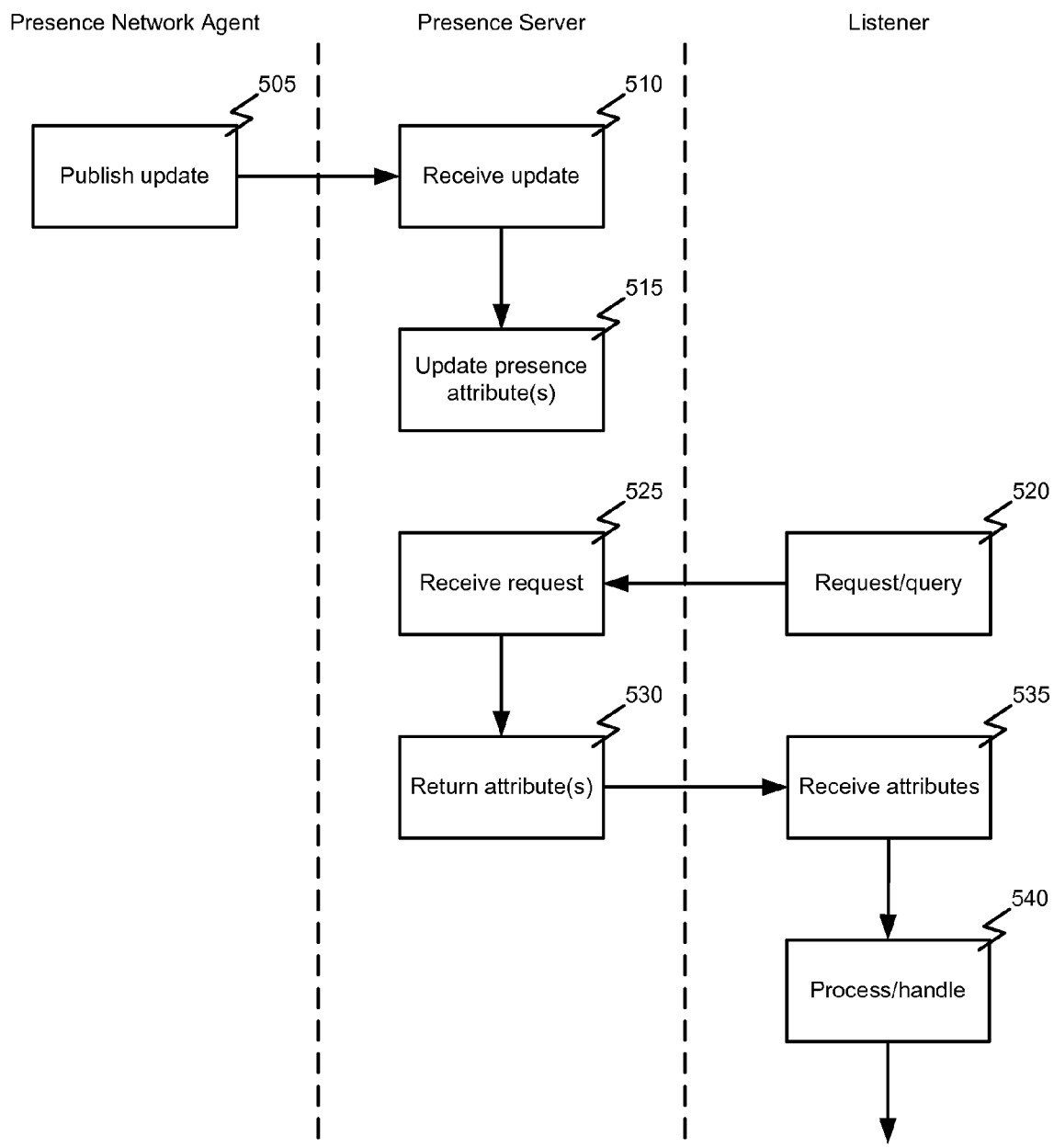
FIG. 5 is a flowchart illustrating a process for monitoring a system according to an alternative embodiment of the present invention.

FIG. 5 is a flowchart illustrating a process for monitoring a system according to an alternative embodiment of the present invention. In this example, the process begins with the presence network agent publishing 505 an update of one or more presence attributes indicating information relating the monitored device, system, application, etc. The publication 505 can be performed via any appropriate message of the underlying protocol of the presence network as described herein.

The presence service can receive 510 the publication of one or more presence attributes from the presence network agent. A presence profile associated with the presence network agent can be updated 515 based on the received presence attributes. As noted above, one or more policies can be applied to the presence attributes by the presence service. Therefore, updating 515 the presence profile associated with the presence network agent can be based on applying the one or more policies.

As some point thereafter, a listener may request 520 or query the presence service for one or more of the presence attributes. The request 520 can be made via any appropriate message of the underlying protocol of the presence network as described herein. The presence server can receive 525 the request and can, in response, return 530 one or more presence attributes of the presence profile associated with the presence network agent. As noted above one or more policies can be applied to the presence attributes by the presence service. Therefore, returning 530 one or more presence attributes of the presence profile associated with the presence network agent can be based on applying the one or more policies. That is, one or more policies can be applied to determine, for example, whether the requesting listener is authorized to receive the requested attributes, how they are to be returned, over what channels, how the attribute is to be transformed, if at all, etc.

The listener can receive 535 the attribute(s) from the presence server. As noted above, the listener can include a handler or other application or process for further handling 540 of the attribute(s). That is, the listener may perform further processing 540 to, for example, inform a user of the listener of the attribute(s), initiate a communication, perform actions to control a process based on the attribute(s), etc.

It should be understood that the process illustrated by FIG. 5 can vary according to the implementation and is offered by way of example only. In another implementation, for example, rather than the listener requesting 520 and receiving 535 an attribute, an application as described above may be adapted to requesting 520 and receiving 535 an attribute. In such a case, processing 540 the received attribute(s) can comprise, for example, determining whether to update/report a status of the monitored system, application, device, etc.

Figure 6:
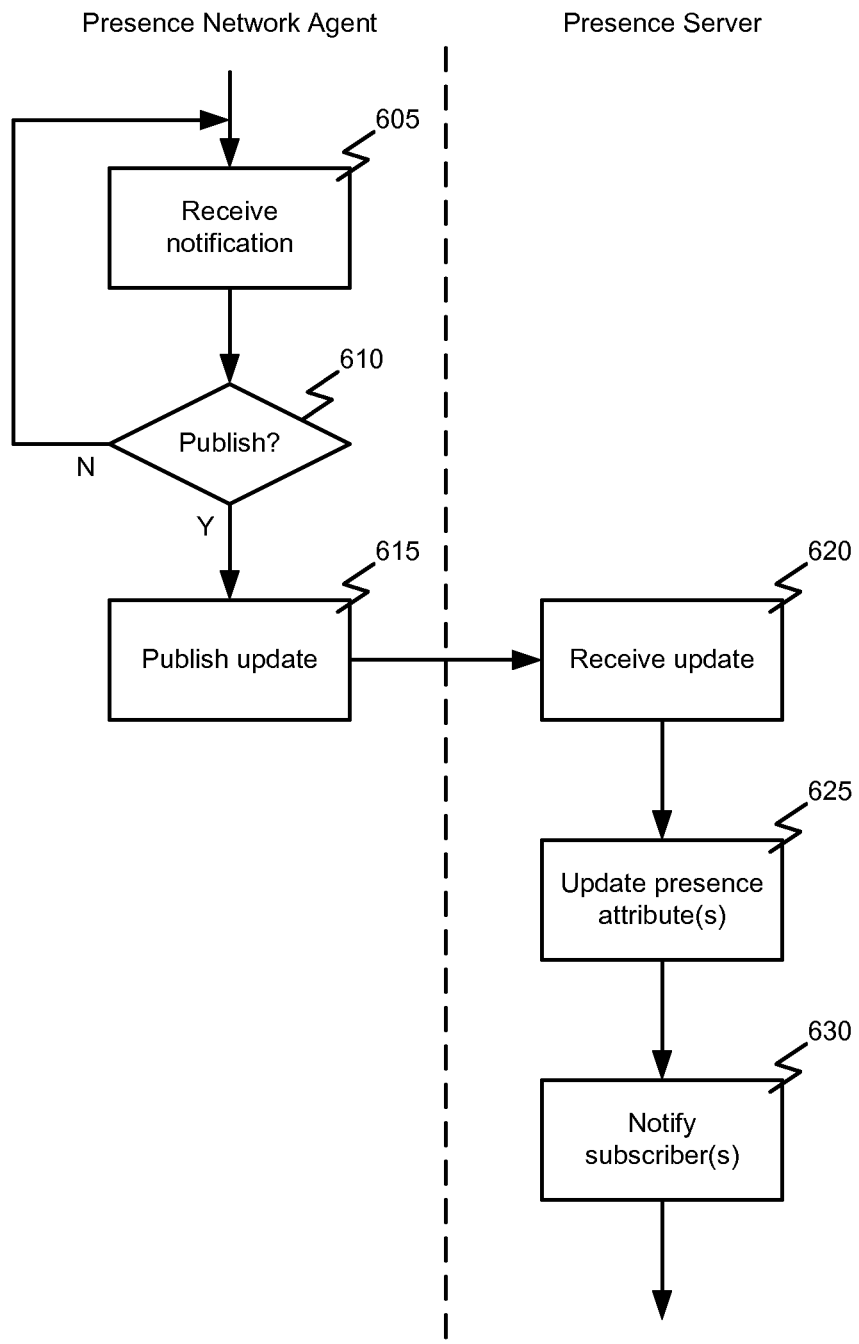
FIG. 6 is a flowchart illustrating a process for monitoring a system according to on embodiment of the present invention.

FIG. 6 is a flowchart illustrating a process for monitoring a system according to on embodiment of the present invention. As noted above, the presence network agent can also receive notification of an event from another element of the system. Thus, in this example, processing begins with the presence network agent receiving 605 a notification of an event or other information from another element of the system. The presence network agent can then determine 610 whether to publish the event or information to the presence server. This determination 610 can be based on, for example, whether the corresponding attribute has changed, a set of policies applied by the presence network agent, etc. In response to determining 610 to publish the event or information, the presence network agent can publish 615 an update of one or more presence attributes indicating information relating the monitored device, system, application, etc. Again, the publication 615 can be performed via any appropriate message of the underlying protocol of the presence network as described herein.

The presence service can receive 620 the publication of one or more presence attributes from the presence network agent. A presence profile associated with the presence network agent can be updated 625 based on the received presence attributes. As noted above one or more policies can be applied to the presence attributes by the presence service. Therefore, updating 625 the presence profile associated with the presence network agent can be based on applying the one or more policies. At least one of the one or more presence attributes of the presence profile associated with the presence network agent can be provided 630 to a listener, i.e., a notification can be sent to the listener. Providing 630 the presence attributes to the listener can also be based at least in part on applying the one or more policies. That is, one or more policies can be applied to determine, for example, which listeners are to be notified, how they are to be notified, over what channels, how the attribute is to be provided, transformed, etc. The notification can be provided 730 to the listener via any appropriate message of the underlying protocol of the presence network as described herein.

Figure 7:
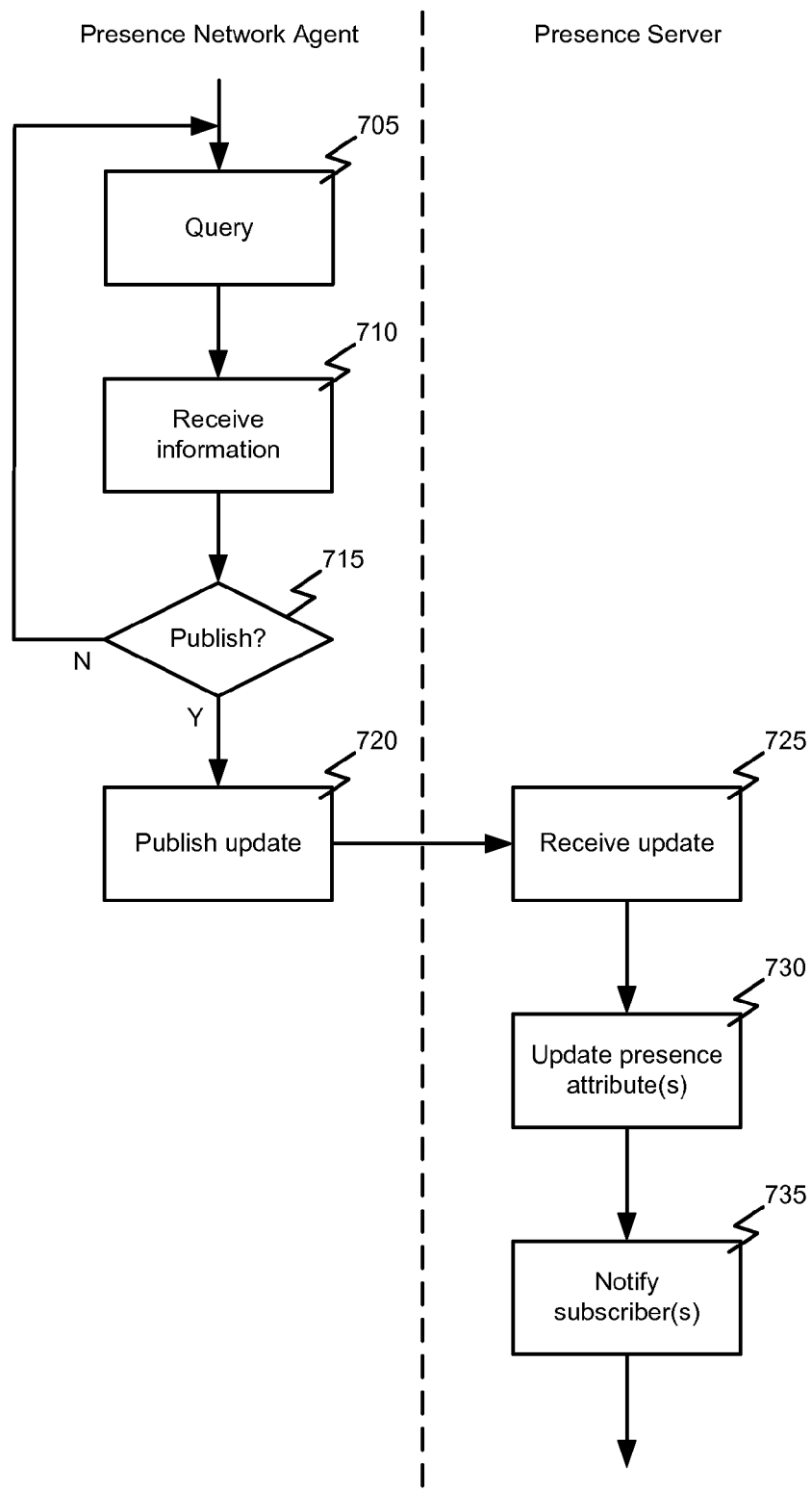
FIG. 7 is a flowchart illustrating a process for monitoring a system according to an alternative embodiment of the present invention.

FIG. 7 is a flowchart illustrating a process for monitoring a system according to an alternative embodiment of the present invention. As noted above, the presence network agent may additionally or alternatively query another element of the system to receive an event or information. Thus, in this example, processing begins with the presence network agent querying another element of the system for status or other information. The presence network agent can the receive 710 information from the other element of the system in response to the query. The presence network agent can then determine 715 whether to publish the event or information to the presence server. This determination 715 can be based on, for example, whether the corresponding attribute has changed, a set of policies applied by the presence network agent, etc. In response to determining 715 to publish the event or information, the presence network agent can publish 720 an update of one or more presence attributes indicating information relating the monitored device, system, application, etc. Again, the publication 720 can be performed via any appropriate message of the underlying protocol of the presence network as described herein.

The presence service can receive 725 the publication of one or more presence attributes from the presence network agent. A presence profile associated with the presence network agent can be updated 730 based on the received presence attributes. As noted above one or more policies can be applied to the presence attributes by the presence service. Therefore, updating 730 the presence profile associated with the presence network agent can be based on applying the one or more policies. At least one of the one or more presence attributes of the presence profile associated with the presence network agent can be provided 735 to a listener, i.e., a notification can be sent to the listener. Providing 735 the presence attributes to the listener can also be based at least in part on applying the one or more policies. That is, one or more policies can be applied to determine, for example, which listeners are to be notified, how they are to be notified, over what channels, how the attribute is to be provided, transformed, etc. The notification can be provided 735 to the listener via any appropriate message of the underlying protocol of the presence network as described herein.

Figure 8:
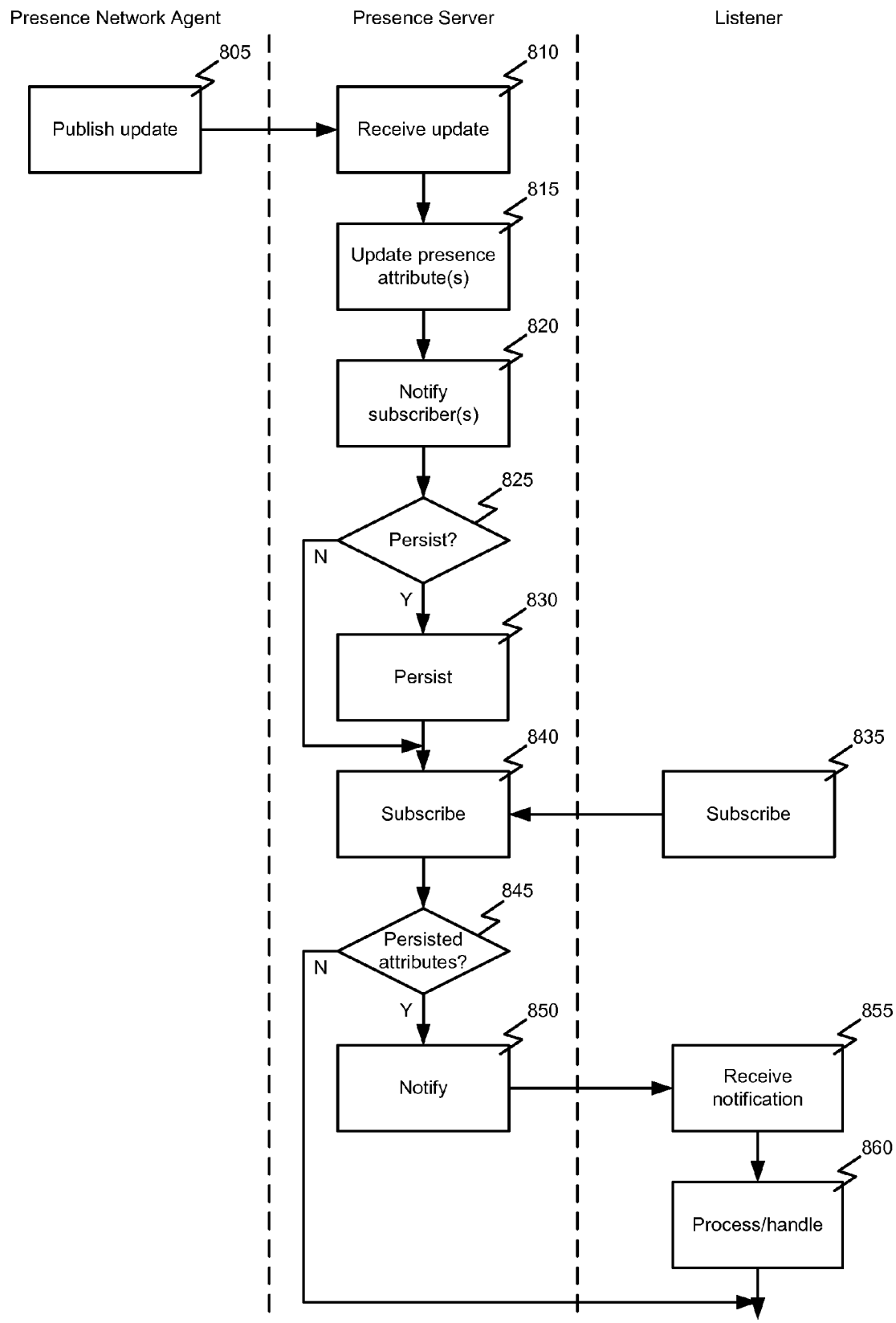
FIG. 8 is a flowchart illustrating additional details of a process for monitoring a system according to an alternative embodiment of the present invention.

FIG. 8 is a flowchart illustrating additional details of a process for monitoring a system according to an alternative embodiment of the present invention. In this example, the process begins with the presence network agent publishing 805 an update of one or more presence attributes indicating information relating the monitored device, system, application, etc. Again, the publication 805 can be performed via any appropriate message of the underlying protocol of the presence network as described herein.

The presence service can receive 810 the publication of one or more presence attributes from the presence network agent. A presence profile associated with the presence network agent can be updated 815 based on the received presence attributes. As noted above one or more policies can be applied to the presence attributes by the presence service. Therefore, updating 815 the presence profile associated with the presence network agent can be based on applying the one or more policies. At least one of the one or more presence attributes of the presence profile associated with the presence network agent can be provided 820 to subscribers, i.e., a notification can be sent to the subscribers. Providing 820 the presence attributes to the listener can also be based at least in part on applying the one or more policies. That is, one or more policies can be applied to determine, for example, which subscribers are to be notified, how they are to be notified, over what channels, how the attribute is to be provided, transformed, etc. The notification can be provided 820 to the listener via any appropriate message of the underlying protocol of the presence network as described herein.

Additionally, a determination 825 can be made as to whether to persist the presence attributes. This determination 825 can be based on application of the policies. That is, the policies can define what attributes should or should not be persisted, if any, how long to persist the attributes, etc. Based on application of the policies and in response to determining 825 to persist the attributes, the attributes can be persisted 830, i.e., can be saved, marked for persistence, etc.

At some point thereafter, the listener can subscribe to 835 and 840 to one or more presence attribute of a presence profile maintained by the presence server. The subscription 835 and 840 can be performed via any appropriate message of the underlying protocol of the presence network as described herein and in a manner consistent with the implementation of the presence server. A determination 845 can be made as to whether the subscribed attributes are currently persisted. This determination 845 can be made, for example, by applying policies to any saved attributes to determine whether the attributes are valid/relevant or have expired such as described, for example, in the application entitled Past Presence Hints referenced above. In response to determining 845 the attributes subscribed to by the listener are persisted, i.e., still relevant or not expired, a notification of the persisted attributed can be sent 850 to the listener.

The listener can receive 855 the notification from the presence server. As noted above, the listener can include a handler or other application or process for further handling 860 of the notification. That is, the listener may perform further processing 860 to, for example, inform a user of the listener of the notification, initiate a communication, perform actions to control a process based on the notification, etc.

Figure 9:
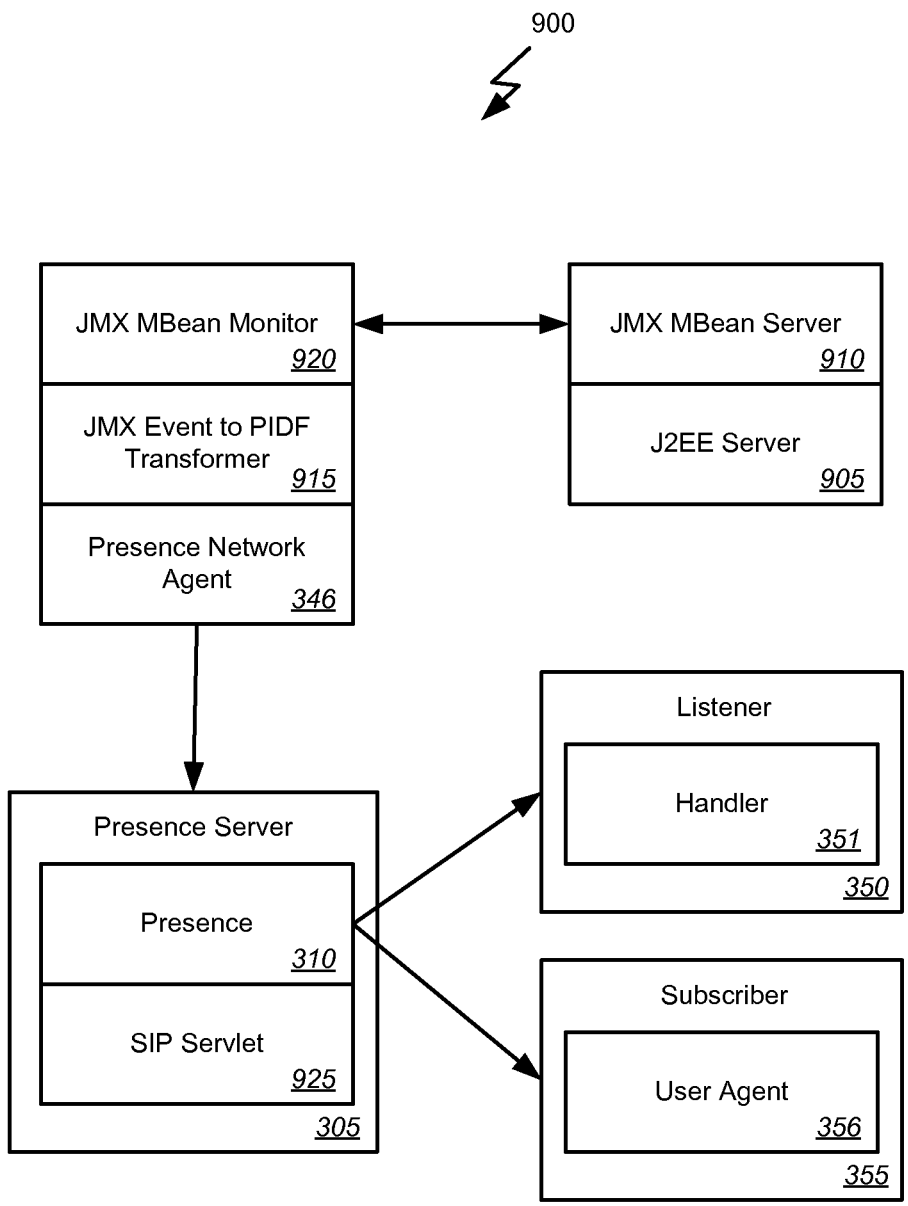
FIG. 9 is a block diagram illustrating additional details of an exemplary implementation of a system according to one embodiment of the present invention.

FIG. 9 is a block diagram illustrating additional details of an exemplary implementation of a system according to one embodiment of the present invention. More specifically, this example illustrates a system such as described above with reference to FIG. 3 but implemented on SIP using Java Management Extensions (JMX) MBean Events. In this case, the system 900 includes a presence server 305 as described above but implemented on a SIP servlet 925 with a presence enabler 310 as known in the art. The listener 350, including handler 351 as described above, can be coupled with the presence server 305 via a communications network (not shown here) implementing SIP.

According to one embodiment, a JMX MBean Monitor 920 can be used, for example, for monitoring one or more conditions, events, readings, results, etc. of the monitored device 346 described above. The JMX MBean Monitor 920 can provide the collected event or other information to a JMX Event to Presence Information Data Format (PIDF) Transformer 915 to convert the event or other information to PIDF. The JMX Event to PIDF Transformer 915 can in turn pass the converted information to the presence network agent 346 to be published as presence attributes to the presence server 305. As noted above, the presence network agent 346 can publish the presence attributes using the known SIP "PUBLISH" method.

Additionally or alternatively, the system 900 can include an application server 905 on which a JMX MBean server 910 is implemented. That is, in addition to or instead of being implemented to monitor a device, the JMX MBean Monitor 920 can be implemented to monitor a process or processes of the application server 905. In such a case, the JMX MBean Monitor 920 can be adapted to monitor the processes, information, events, etc. of the application server 905 via the JMX MBean server 910. Again, the JMX MBean Monitor 920 can provide the collected event or other information to a JMX Event to PIDF Transformer 915 to convert the event or other information to PIDF. The JMX Event to PIDF Transformer 915 can in turn pass the converted information to the presence network agent 346 to be published as presence attributes to the presence server 305, for example, using the known SIP "PUBLISH" method.

Regardless of whether the presence attributes published by the presence network agent 346 relate to information or events from a monitored device or process(es) of the application server 905, the presence module 310 of the presence server can be adapted to provide the presence attributes to the listener 350. As noted above, the presence server 305 can implement a publish/subscribe model. In such a case, the listener 350 after subscribing to the presence attributes, can receive notification provided by the presence server 305 upon a change of the presence attribute(s) subscribed to. The notifications can comprise, for example, a SIP "NOTIFY" message.

As noted above, the system 900 can additionally or alternatively include another subscriber device 355. A user agent 356 operating on the subscriber device 355 can be adapted to subscribe to and receive notifications of changes to presence attributes 326 published by a principal. Thus, the user agent 356 can be adapted to monitor one or more presence attributes for administration and/or management purposes. For example, the user agent 356 can be a "watcher" that can be present on any device or application. Therefore, a status or update for a monitored system can be provided to any device that has a user agent 356 or "watcher."

In use, embodiments of the present invention can provide a variety of functions including but not limited to enabling chat, voice, web conf interaction from a desktop application, enabling cross device interactions, enable workflow applications efficiency, expose presence state of applications for efficient end-user interaction, performing intelligent call routing in VoIP, providing a multi-channel follow-me service, creating efficient notification systems, improving application interaction with end-users, etc. As noted, the information monitored by such a system 900 can comprise event information and can be used by the system 900 to implement an Event Driven Architecture (EDA). For example, applications subscribing to presence of other principals in such an EDA can perform CRM/call center applications that direct IM or SIP interactions, EM monitoring of a process, push email/notification to client, etc. Additionally or alternatively, an application in an EDA can provide notice of its presence information to a process publishing presence information available for EM monitoring or to an administrator who can monitor processes that he is in charge of through it's presence agent and be notified when status changes occur. In yet another example, an application in an EDA can query presence information maintained by an intelligent messaging/notification server to decide where to send a message/notification or present a corporate directory web page based on such a query.

FIG. 10 is a block diagram illustrating, at a high-level, functional components of a system for monitoring a system according to an alternative embodiment of the present invention. As noted above, embodiments of the present invention, such as illustrated here, can be implemented on an Enterprise Service Bus (ESB) 1005. In such an implementation, the source or publisher of an event can be the ESB 1005 or can publish the event via the ESB 1005. Additionally or alternatively, the subscriber or recipient of the event can be the ESB 1005 or can receive the event via the ESB 1005.

More specifically, the system 1000 of this example includes a number of devices 345 and 350 communicatively coupled with the ESB 1005. The devices 345 and 350 can include a monitored device 345 and a listener 350 as described above. Additionally or alternatively, the system 1000 can include an application 360 and/or another subscriber 355 device or system 355 as described above and also communicatively coupled with the ESB 1005.

The system 1000 can also include a presence server 305 as described above and communicatively coupled with the ESB 1005. As noted, the presence service provided via the presence enabler 310 of the presence server 305 can maintain a set of presence profiles 325 for any number of principals participating in the service. For example, a presence profile 325 can be maintained for or related to the monitored device 345. The presence profile 325 can include a set of one or more presence attribute 326. The presence attributes 326 can include attributes identifying or related to presence information as noted above. However, the presence attributes 326 described herein are not limited to identifying or indicating presence information. Rather, embodiments of the present invention provide for using presence attributes 326 to identify or indicate any type of information related to the principal such as the monitored device 345. For example, such information can include but is not limited to a state or status, information collected or generated by an application or process, etc, as well as presence information. Additionally or alternatively, information indicated by the presence attributes can include other types of information. For example, information indicated by one or more presence attributes can include but is not limited to a multimedia document, a Uniform Resource Identifier (URI) to a document of stream, etc maintained by or provided via a media server 1010 communicatively coupled with the ESB 1005.

Generally speaking, the system 1000 can provide for handling an event published as a presence attribute 326 by a principal. According to one embodiment, the source or publisher of an event can be the ESB 1005. For example, the ESB can be implemented on SIP and events can be published via JMX MBean Events as described above. Additionally or alternatively, the source or publisher of the event can be the presence network agent 346 of the monitored device 345 as described above that passes the event to the presence server 305 via the ESB 1005. As described, the presence server 305, based on the application of policies 320, can handle the event by notifying one or more listeners 350 or subscribers. According to one embodiment of the present invention, the subscriber can be the ESB 1005 which receives the notification and in turn passes the notification and/or attributes to or otherwise informs another element of the system 1000 such as the listener 350 or other subscriber 355 which in turn processes the attributes as described above.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A monitoring system comprising:
an Enterprise Service Bus (ESB);
a monitored device associated with a presence network agent, the present network agent receiving monitored information from the monitored device and publishing one or more presence attributes via the ESB in response to receiving the monitored information;
a presence server communicatively coupled with the ESB, the presence server receiving the one or more published presence attributes from the presence agent of the monitored device via the ESB and updating a presence profile associated with the monitored device based on the received presence attributes, wherein the received presence attributes comprise at least one attribute indicating presence or location information and a plurality of attributes indicating information other than presence information, wherein the information other than presence information includes at least each of information indicating a non-presence status of a monitored device, a measurement from a monitored sensor other than a presence or location measurement, and a multimedia document, wherein the non-presence status indicates a status of the monitored device other than presence or location, and wherein updating the presence profile associated with the monitored device comprises storing the received at least one presence attribute indicating presence or location information and the plurality of presence attributes indicating information other than presence information all as attributes of the presence profile associated with the monitored device.

2. The system of claim 1, wherein the presence network agent comprises a Java Management Extension (JMX) MBean Monitor and wherein publishing one or more presence attributes comprises publishing Presence Information Data Format (PIDF) information.

3. The system of claim 2, wherein the presence network agent is adapted to request monitored information, receive the monitored information in response to the request, and publish the one or more presence attributes in response to receiving the monitored information.

4. The system of claim 1, further comprising a listener communicatively coupled with the presence server and adapted to receive presence attributes from the presence server.

5. The system of claim 4, wherein the listener is adapted to subscribe to the at least one of the one or more presence attributes of the presence profile and wherein the presence server provides the at least one presence attribute to the listener by providing a notification of a change in the at least one presence attribute.

6. The system of claim 4, wherein the listener is adapted to request the presence attributes from the presence server and wherein the presence server provides the at least one presence attribute to the listener in response to the request.

7. The system of claim 4, wherein the listener comprises a handler adapted to process the presence attributes received from the presence server.

8. The system of claim 4, wherein the information other than presence information comprises event information.

9. The system of claim 8, wherein the presence server is further adapted to provide an Event Driven Architecture (EDA) based on the event information.

10. The system of claim 9, wherein the EDA is adapted to persist the one or more presence attributes based on one or more policies.

11. The system of claim 10, wherein the EDA is adapted to expire the one or more presence attributes based on one or more policies.

12. The system of claim 10, wherein the EDA is adapted to provide notification of past events to the listener based on one or more policies.

13. The system of claim 9, wherein the EDA is implemented on the ESB.

14. The system of claim 9, wherein the ESB is implemented on the EDA.

15. The system of claim 9, wherein the ESB is adapted to subscribed to at least one of the one or more presence attributes of the presence profile associated with the presence network agent and receive a notification of a change in the at least one presence attribute from the presence server.

16. The system of claim 15, wherein the ESB is adapted to publish one or more presence attributes to the presence server.

17. The system of claim 16, wherein the ESB is adapted to publish the one or more presence attributes using Java Management Extensions (JMX) MBean Events.

18. The system of claim 9, wherein the EDA is adapted to provide real-time monitoring of a device associated with the presence network agent.

19. The system of claim 18, wherein the presence attributes further comprise at least one attribute indicating presence information and one or more attributes indicating each of a non-presence status of a monitored device or process wherein the non-presence status indicates a status of the monitored device other than presence or location, a measurement from a monitored device other than a presence or location measurement, non-presence information collected or generated by a monitored application or process, and a multimedia document.

20. The system of claim 19, wherein the EDA provides tracking of the device associated with the presence network agent based on the at least one attribute indicating presence information.

21. The system of claim 20, wherein the device associated with the presence network agent comprises a Radio Frequency IDentification (RFID) tag.

22. The system of claim 18, wherein the device associated with the presence network agent comprises a sensor and the EDA is adapted to perform process monitoring based on at least one of the presence attributes.

23. The method of claim 1, wherein the information other than presence information further comprises non-presence information collected or generated by a monitored application or process.

24. The method of claim 23, wherein the information other than presence information further comprises a Uniform Resource Identifier (URI) to a document.

25. The method of claim 24, wherein the information other than presence information further comprises a URI to a multimedia stream.

26. A method of monitoring a system, the method comprising:
receiving at a presence network agent information from a monitored device associated with the presence network agent;
publishing by the presence network agent a plurality of presence attributes via an Enterprise Service Bus (ESB) in response to receiving the information from the monitored device;

receiving at a presence server through the ESB the publication of the plurality of presence attributes from the presence network agent, the received presence attributes comprising at least one attribute indicating presence or location information and a plurality of attributes indicating information other than presence information, wherein the information other than presence information includes at least each of information indicating a non-presence status of a monitored device, a measurement from a monitored sensor other than a presence or location measurement, and a multimedia document, and wherein the non-presence status indicates a status of the monitored device other than presence or location;

updating a presence profile associated with the presence network agent with the presence server based on the received presence attributes, wherein updating the at least one presence profile comprises storing the received at least one presence attribute indicating presence or location information and the plurality of presence attributes indicating information other than presence information all as attributes of the presence profile associated with the monitored device; and providing at least one of the one or more presence attributes of the presence profile associated with the presence network agent from the presence server to a listener.

27. The method of claim 26, wherein providing at least one of the one or more presence attributes of the presence profile associated with the presence network agent to the listener comprises providing a notification of a change in the at least one presence attribute.

28. The method of claim 26, further comprising receiving at the presence server a request from the listener for at least one of the one or more presence attributes of the presence profile associated with the presence network agent and wherein providing the at least one presence attribute to the listener is performed in response to the request.

29. The method of claim 26, wherein the information other than presence information comprises event information.

30. The method of claim 29, further comprising providing with the presence server an Event Driven Architecture (EDA) based on the event information.

31. The method of claim 30, wherein providing the EDA comprises providing real-time monitoring of a device associated with the presence network agent.

32. The method of claim 30, wherein providing the EDA comprises persisting one or more of the presence attributes based on one or more policies.

33. The method of claim 32, wherein providing the EDA comprises expiring one or more of the presence attributes based on one or more policies.

34. The method of claim 32, wherein providing the EDA comprises providing notification of past events to the listener based on one or more policies.

35. The method of claim 30, wherein providing the EDA comprises providing tracking of the device associated with the presence network agent based on the at least one attribute indicating presence information.

36. The method of claim 30, wherein the device associated with the presence network agent comprises a sensor and wherein providing the EDA comprises performing process monitoring based on at least one of the presence attributes.

37. The method of claim 36, wherein providing the EDA comprises providing real-time monitoring of a process associated with the presence network agent.

38. The method of claim 37, wherein providing real-time monitoring of the process associated with the presence network agent comprises providing a notification of a change in status of the process based on one or more of the presence attributes.

* * * * *

UNITED STATES PATENT AND TRADEMARK OFFICE
CERTIFICATE OF CORRECTION

| | | |
|---|---|---|
| PATENT NO. | : 8,914,493 B2 | Page 1 of 1 |
| APPLICATION NO. | : 12/045220 | |
| DATED | : December 16, 2014 | |
| INVENTOR(S) | : Stephane H. Maes et al. | |

It is certified that error appears in the above-identified patent and that said Letters Patent is hereby corrected as shown below:

In The Claims

Column 22, Claim 23, Line 49:

Replace "The method of claim 1,..." with -- The system of claim 1,... --

Column 22, Claim 24, Line 53:

Replace "The method of claim 23,..." with -- The system of claim 23,... --

Column 22, Claim 25, Line 56:

Replace "The method of claim 24,..." with -- The system of claim 24,... --

Signed and Sealed this
Fourteenth Day of June, 2016

Michelle K. Lee
*Director of the United States Patent and Trademark Office*